(12) United States Patent
Ono

(10) Patent No.: US 9,609,156 B2
(45) Date of Patent: Mar. 28, 2017

(54) FUNCTION EXECUTION APPARATUS, FUNCTION EXECUTION METHOD, AND NON-TRANSITORY COMPUTER READABLE MEDIUM STORING INSTRUCTIONS THEREFOR

(71) Applicant: BROTHER KOGYO KABUSHIKI KAISHA, Nagoya, Aichi (JP)

(72) Inventor: Takatoshi Ono, Yokkaichi (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days.

(21) Appl. No.: 14/868,847

(22) Filed: Sep. 29, 2015

(65) Prior Publication Data

US 2016/0094738 A1    Mar. 31, 2016

(30) Foreign Application Priority Data

Sep. 30, 2014   (JP) ................. 2014-199999

(51) Int. Cl.
| | |
|---|---|
| *H04N 1/00* | (2006.01) |
| *G06F 3/0481* | (2013.01) |
| *G06F 3/0488* | (2013.01) |
| *G06F 9/44* | (2006.01) |

(52) U.S. Cl.
CPC ....... *H04N 1/00501* (2013.01); *G06F 3/0488* (2013.01); *G06F 3/04817* (2013.01); *G06F 9/4443* (2013.01); *H04N 1/00392* (2013.01); *H04N 1/00424* (2013.01); *H04N 1/00482* (2013.01); *H04N 2201/0094* (2013.01)

(58) Field of Classification Search
USPC ....................................................... 358/1.15
See application file for complete search history.

(56) References Cited

U.S. PATENT DOCUMENTS

| | | | |
|---|---|---|---|
| 2006/0187483 A1* | 8/2006 | Baba ................ | H04N 1/00389 358/1.15 |
| 2011/0242561 A1* | 10/2011 | Nitta ................ | G06F 3/04886 358/1.9 |
| 2013/0027736 A1* | 1/2013 | Kittaka ............. | G06F 3/04817 358/1.14 |

FOREIGN PATENT DOCUMENTS

JP        2009-104340 A        5/2009

* cited by examiner

*Primary Examiner* — Ngon Nguyen
(74) *Attorney, Agent, or Firm* — Scully, Scott, Murphy & Presser, PC

(57) ABSTRACT

A function execution method includes a selection step in which the a user is encouraged to select multiple shortcut functions to be executed subsequently from among a registered plurality shortcut functions each of which is configured to be executed with user of a preliminarily setting value necessary for executing the particular function, a continuous execution registration step in which a continuous execution function configured to execute the multiple shortcut functions selected in the selection step such that the multiple functions are executed in accordance with a particular order, a displaying step in which a continuous execution key corresponding to the continuous execution functions registered in the continuous execution registration step, and a continuous execution step in which, when the continuous execution key displayed by the displaying step is selected, the controller executes the multiple shortcut functions constituting the continuous execution function in accordance with the execution order.

16 Claims, 15 Drawing Sheets

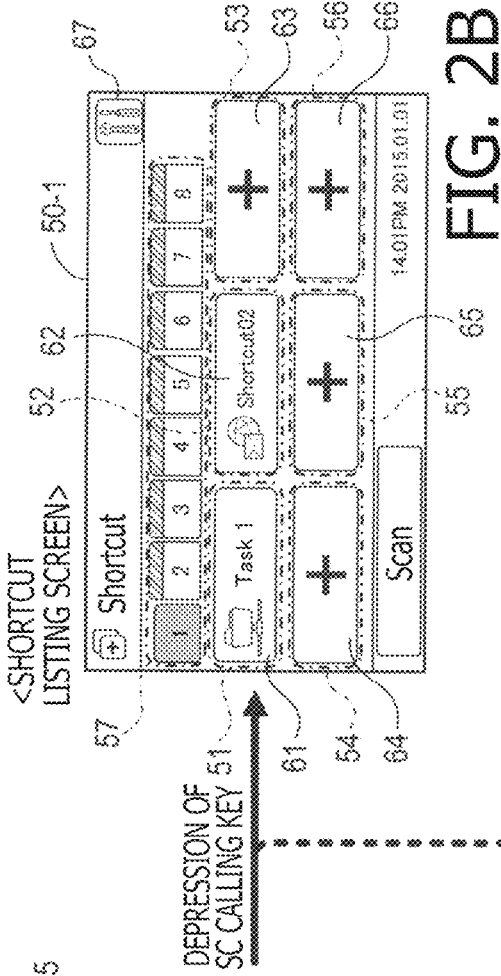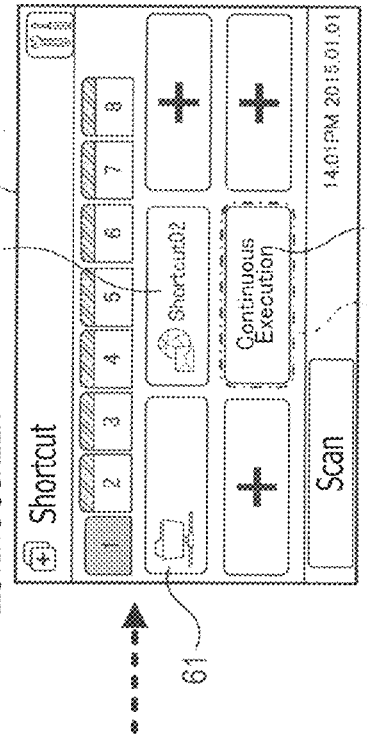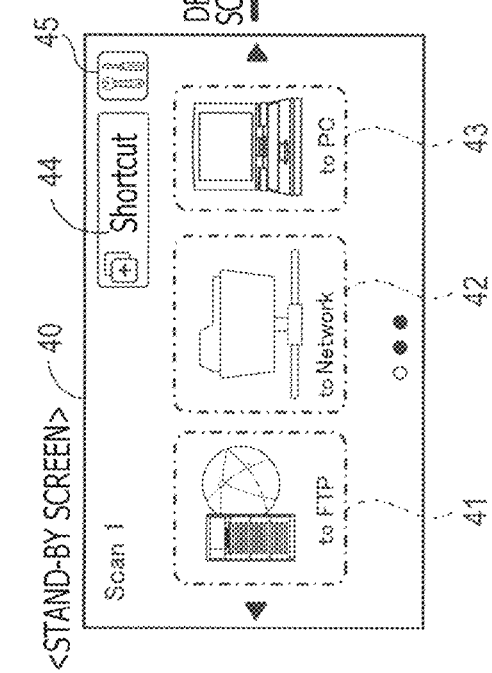

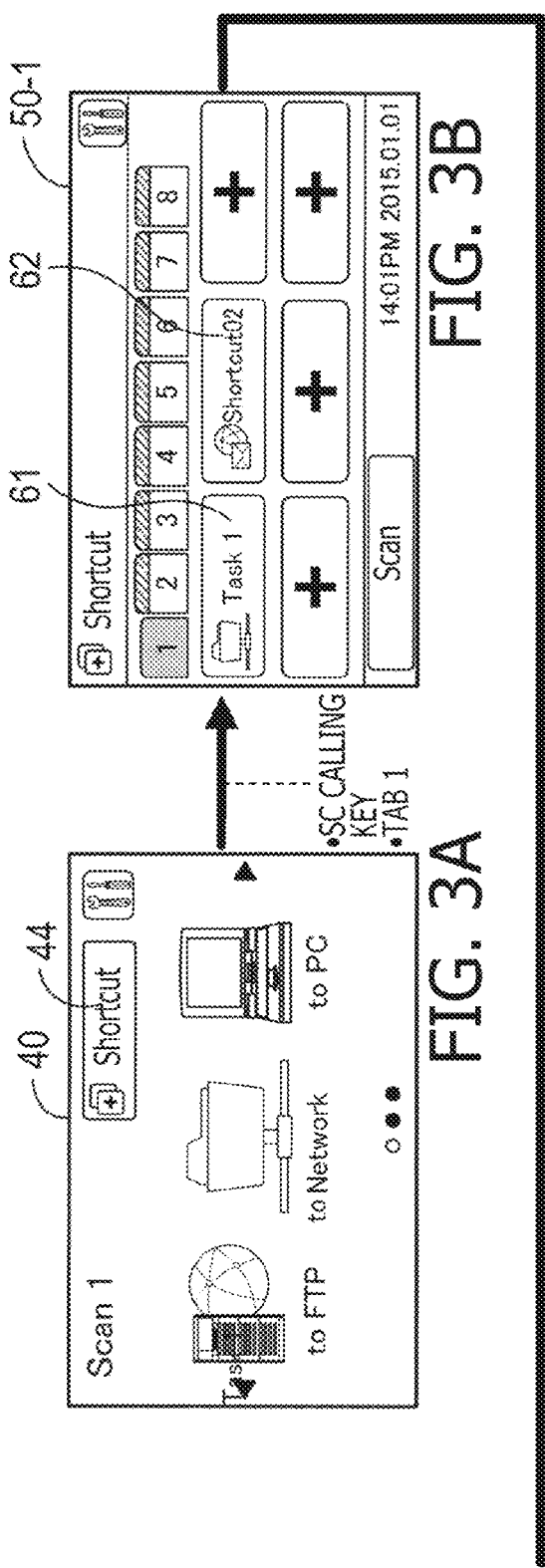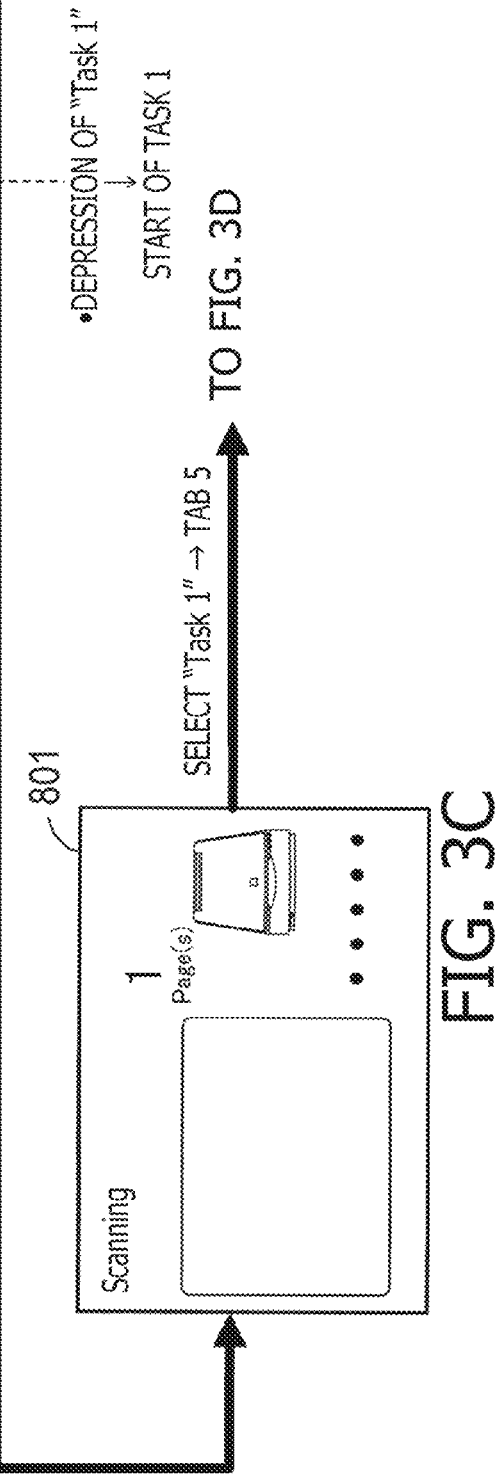

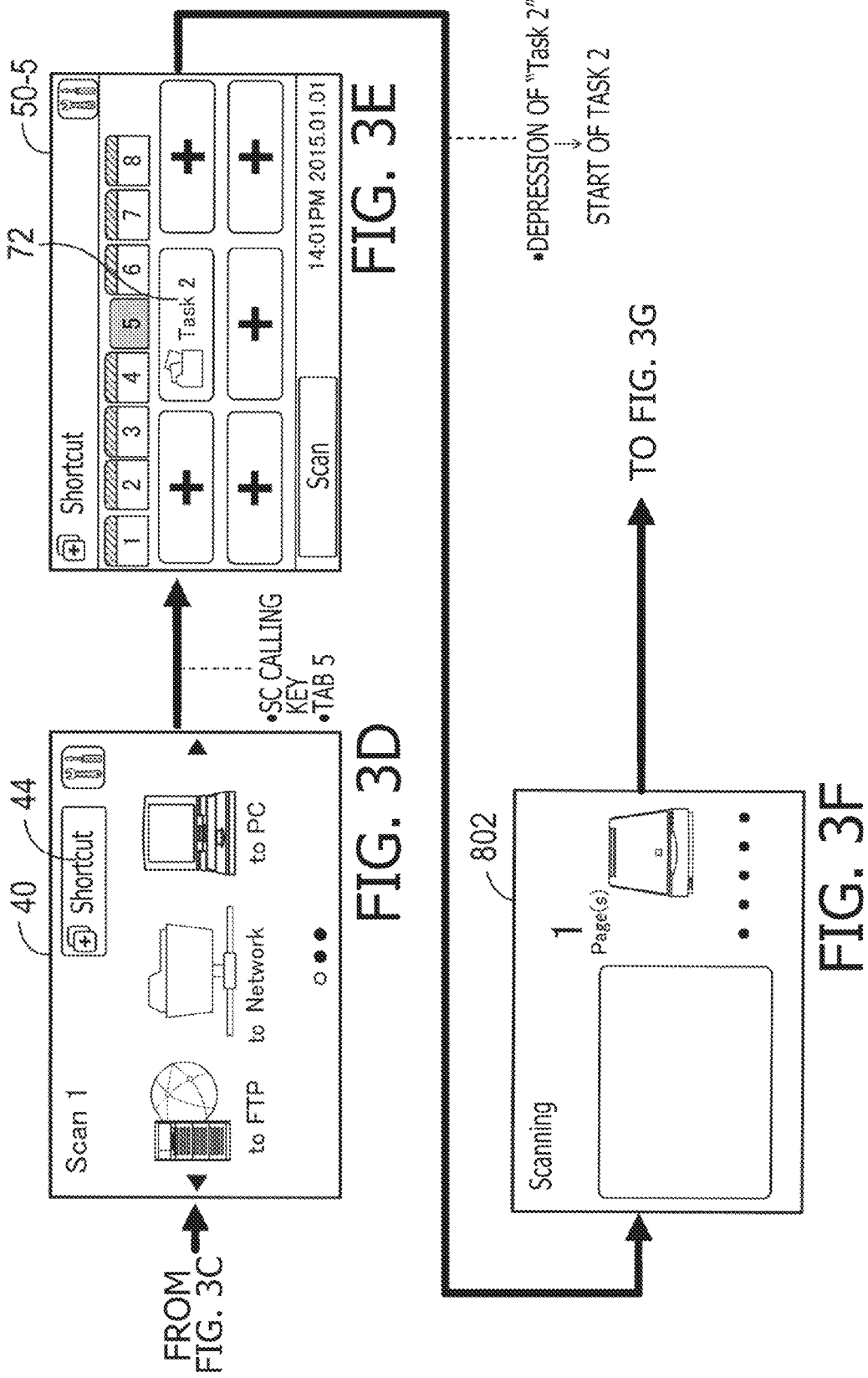

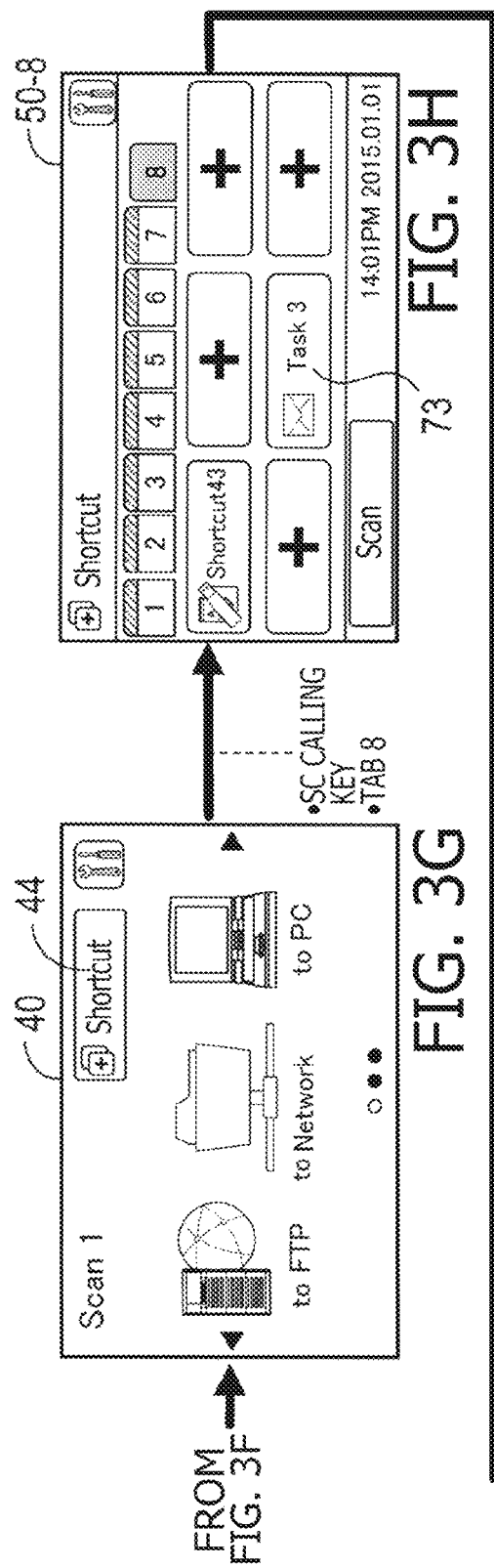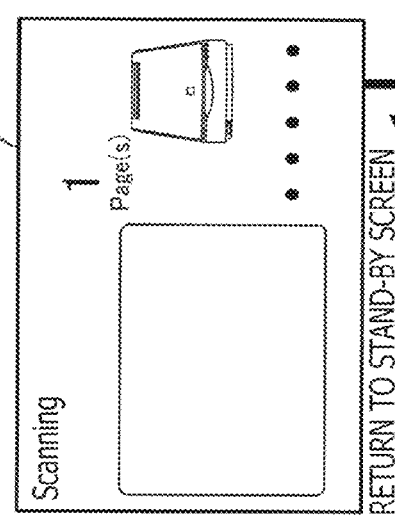

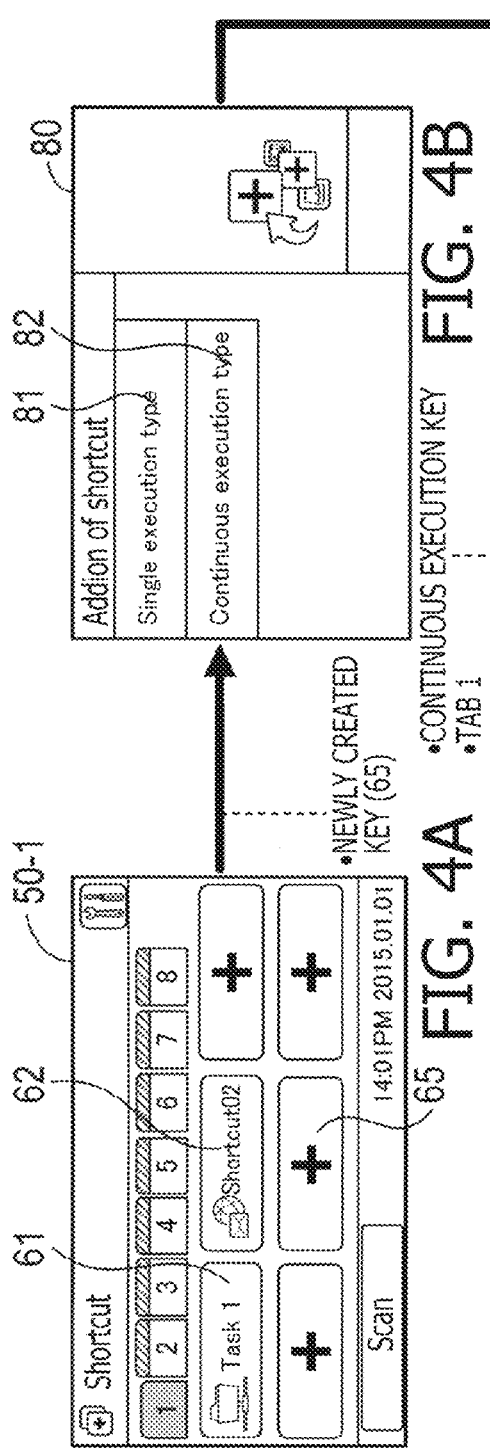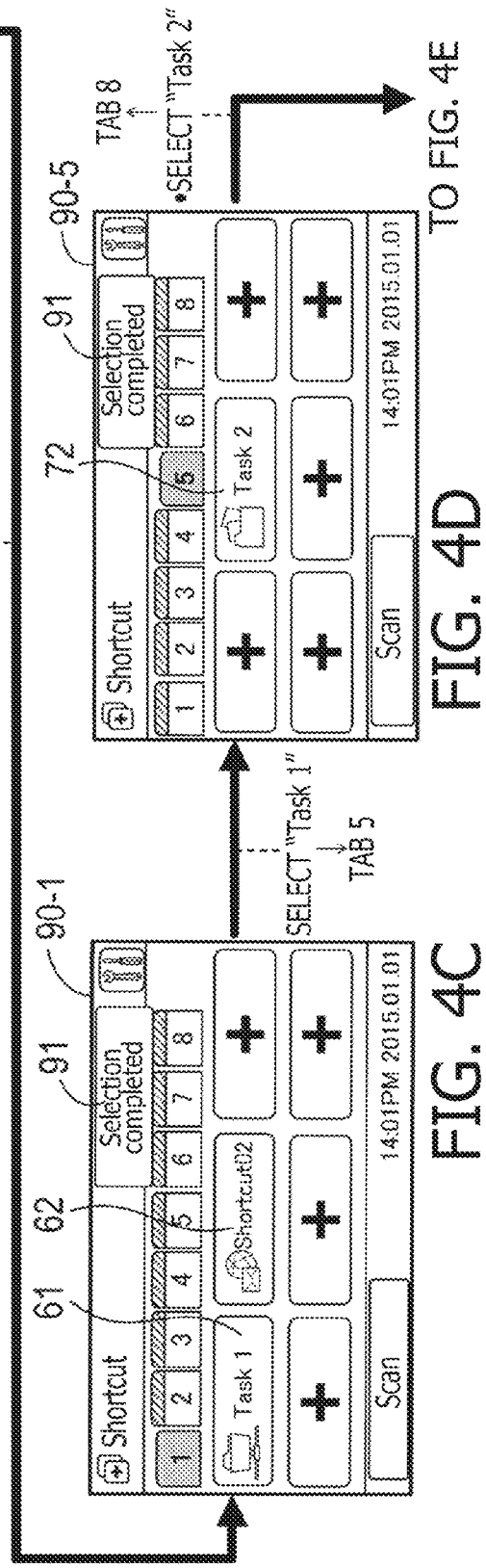

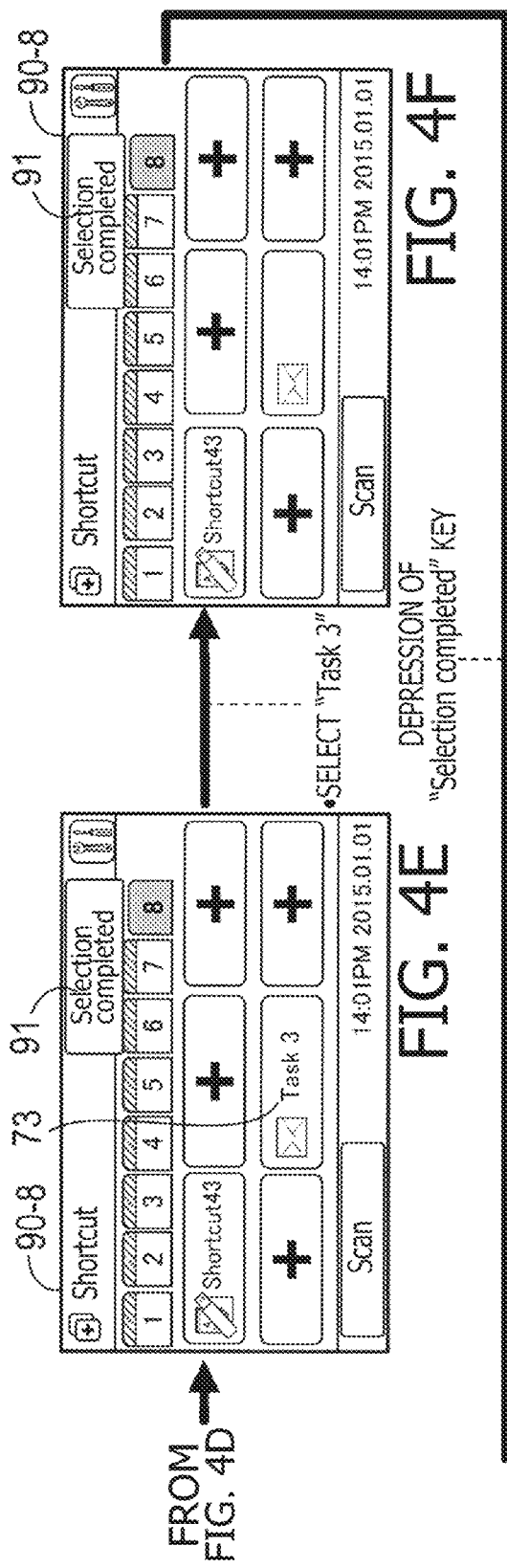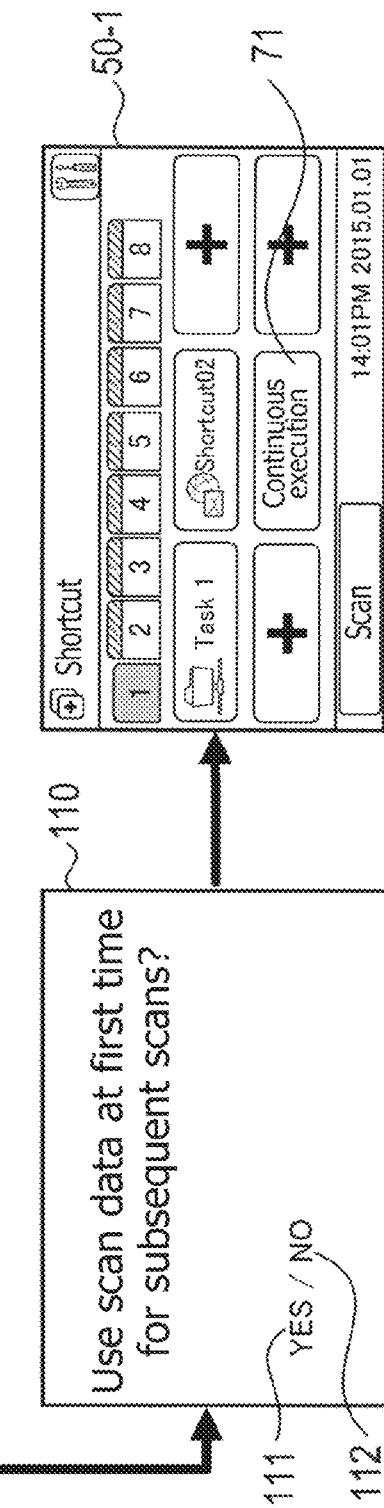

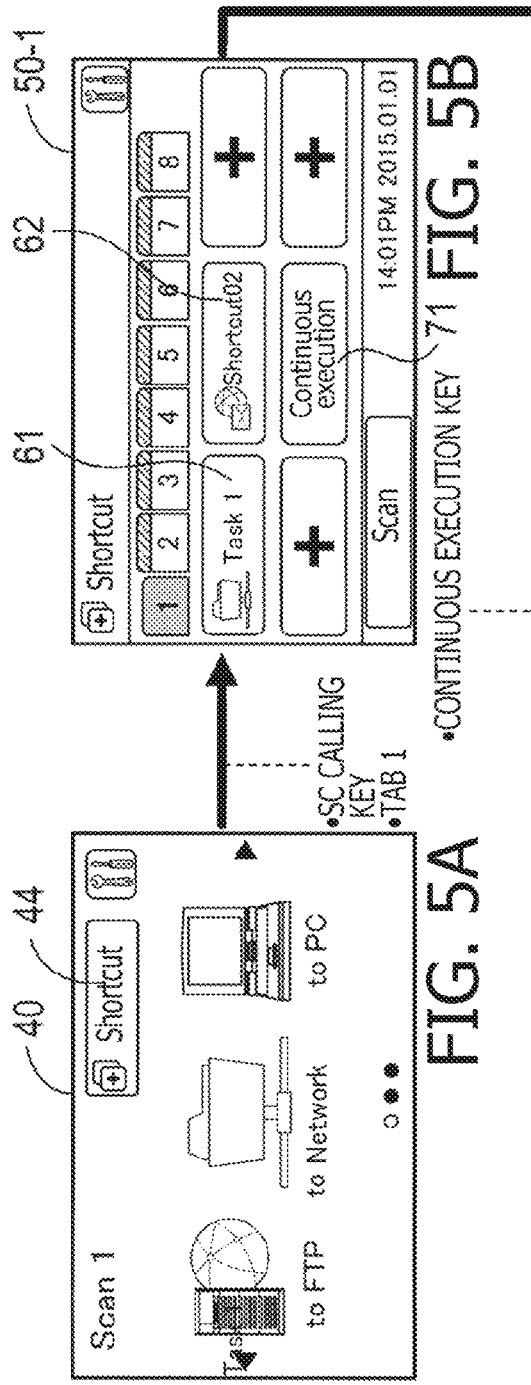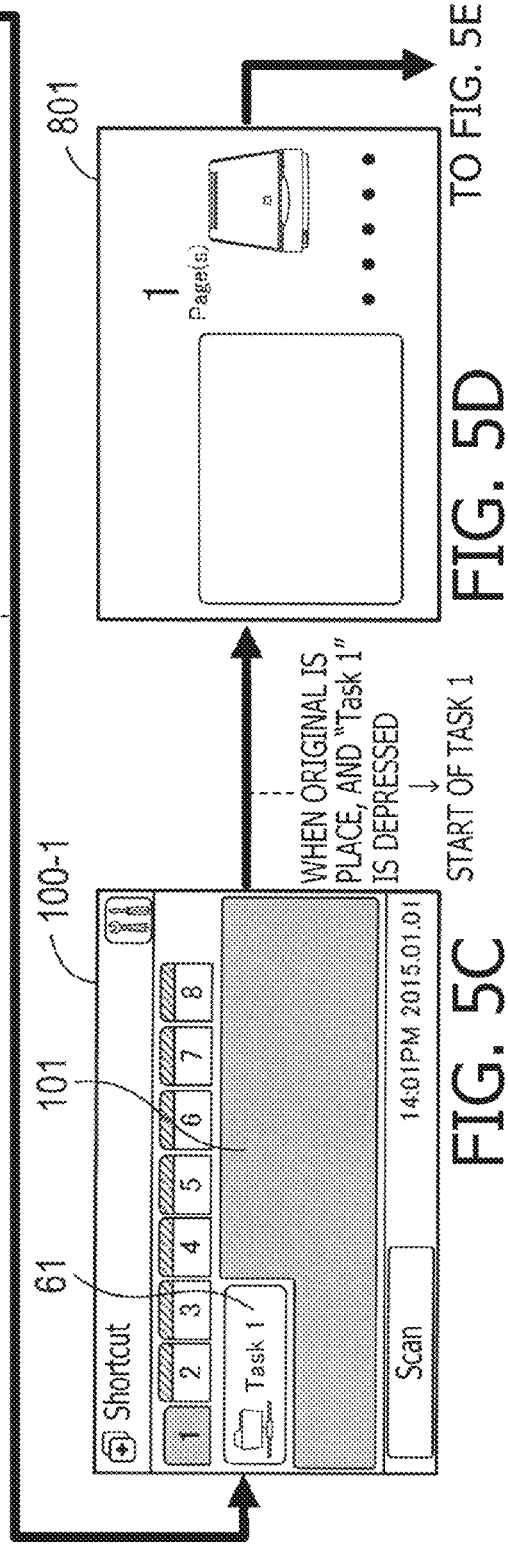

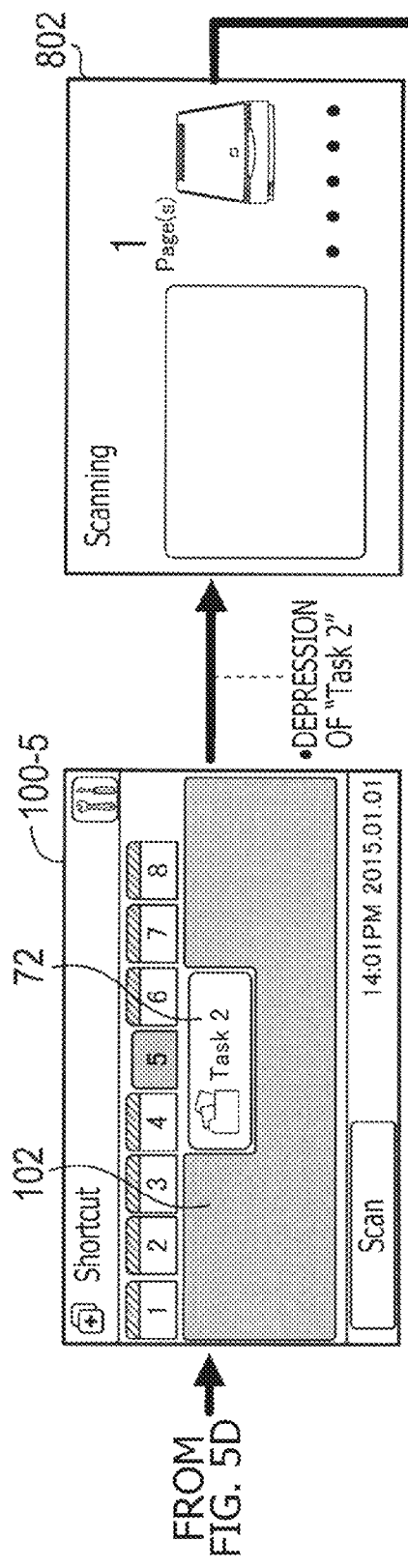
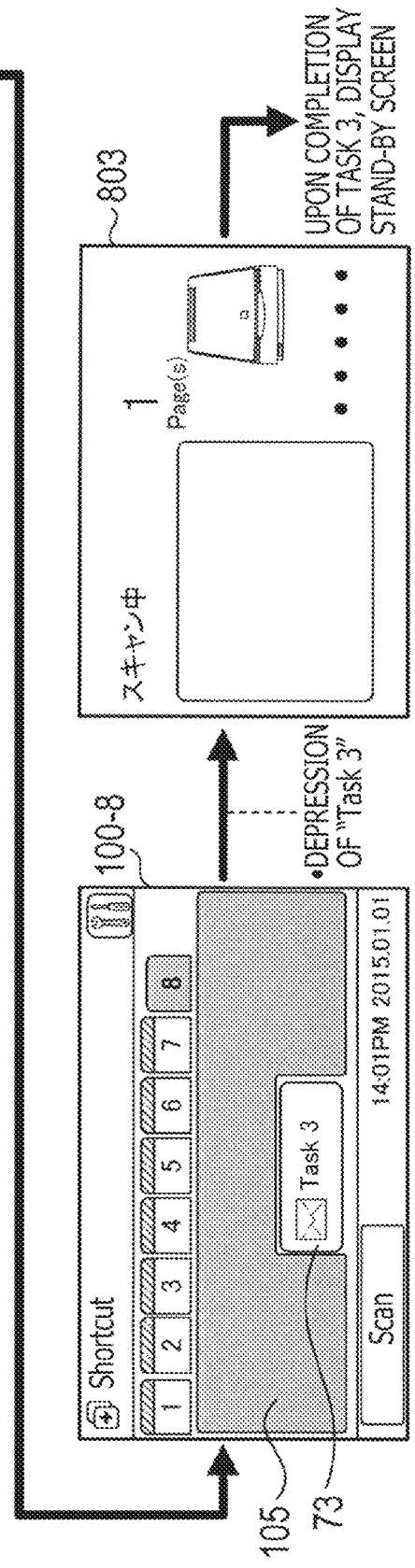

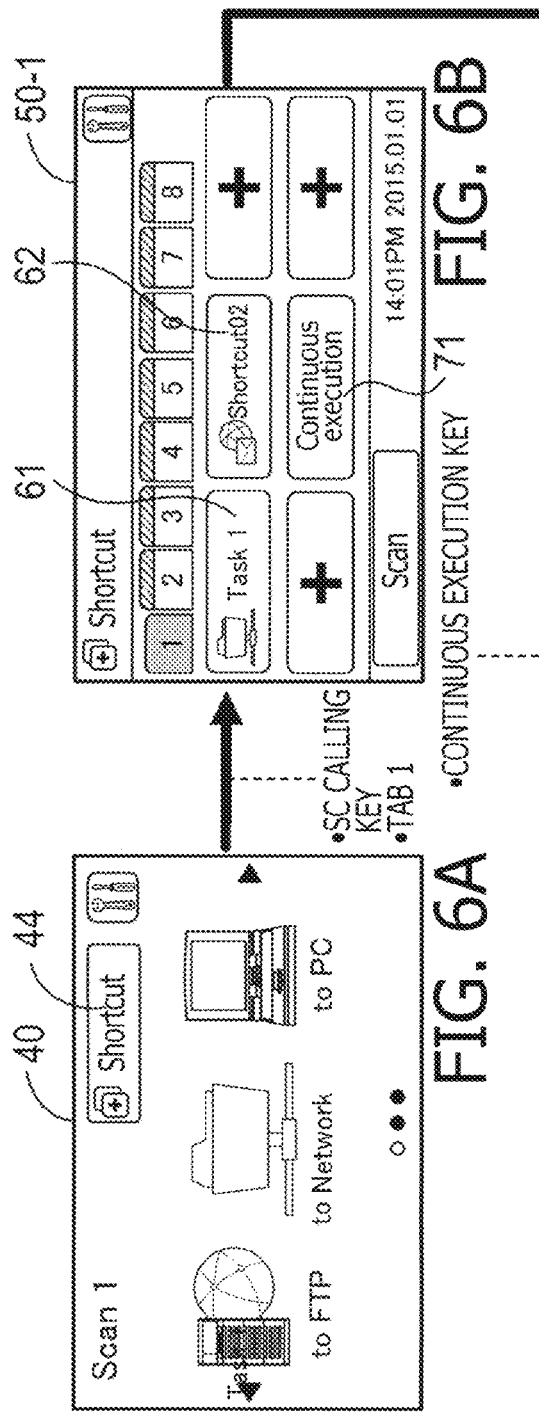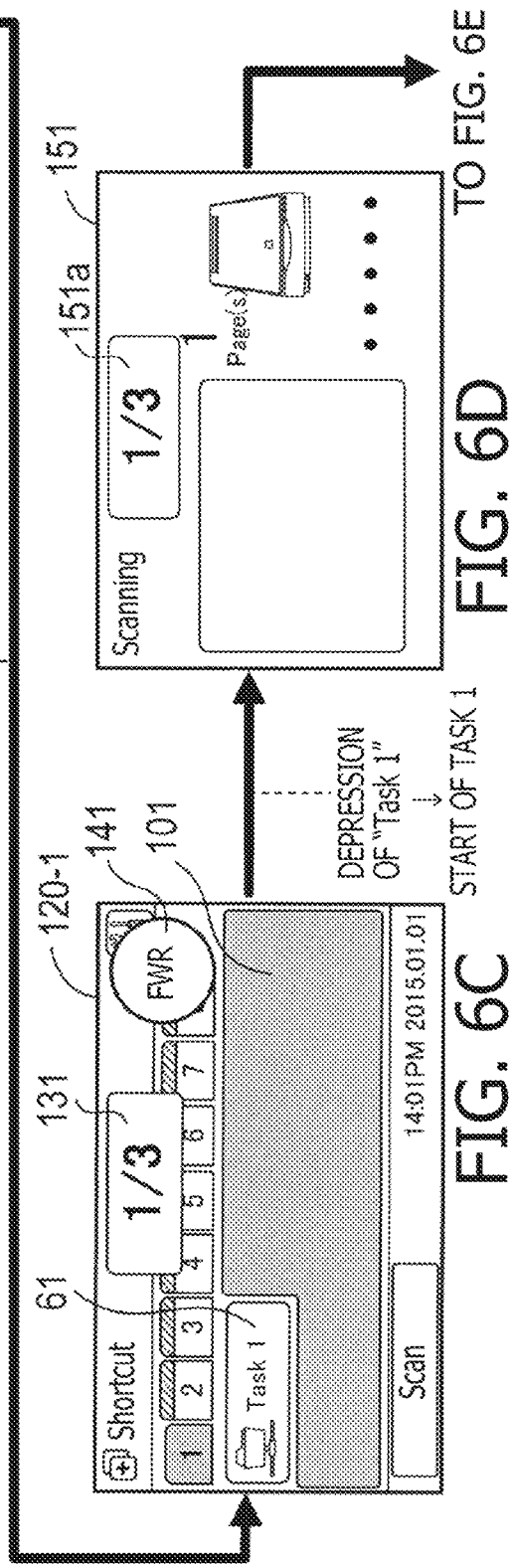

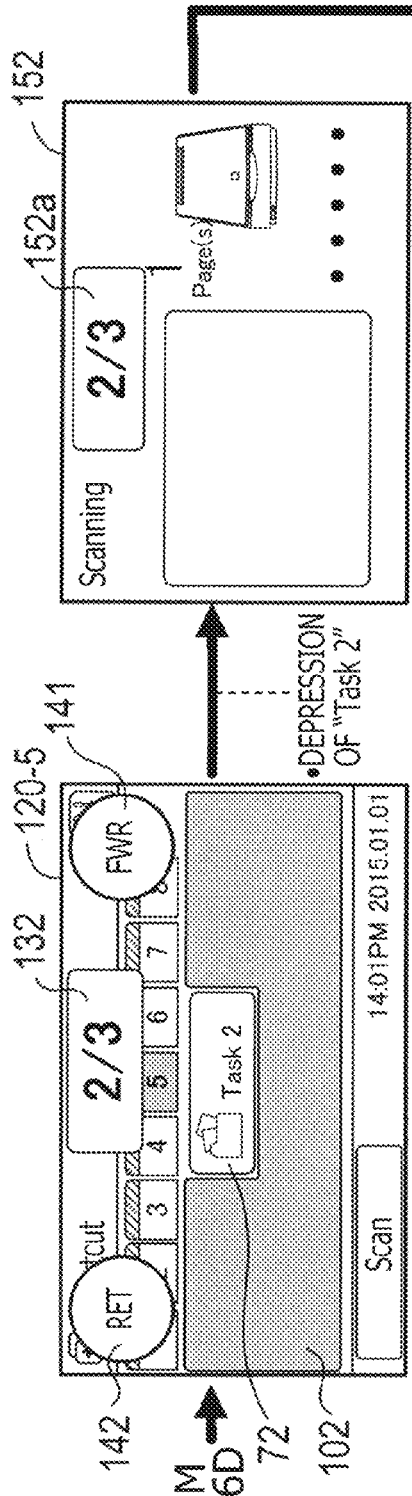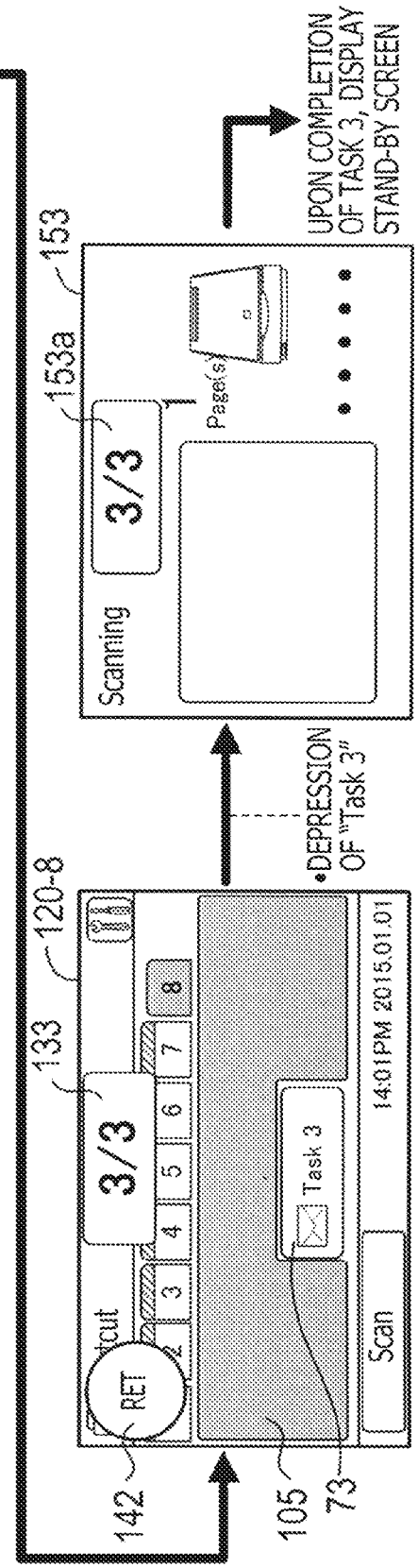

FUNCTION EXECUTION APPARATUS, FUNCTION EXECUTION METHOD, AND NON-TRANSITORY COMPUTER READABLE MEDIUM STORING INSTRUCTIONS THEREFOR

CROSS-REFERENCE TO RELATED APPLICATION

This application claims priority under 35 U.S.C. §119 from Japanese Patent Application No. 2014-199999 filed on Sep. 30, 2014. The entire subject matter of the application is incorporated herein by reference.

BACKGROUND

Technical Field

The present disclosures relate to a function execution apparatus capable of executing a plurality of functions, a method of executing such functions, and a non-transitory computer readable recording medium storing instructions which, when executed by a computer, causes the computer to execute such a method.

Related Art

Various function execution apparatuses configured to execute multiple functions have been provided. In such a function execution apparatus, a "shortcut" which is a command or the like that activates a particular function based with particular setting values is generally used. When such a shortcut is registered in advance, a user can activate the registered function which typically includes a plurality of steps of process with a simple operation (e.g., by depressing a shortcut key).

By registering functions which could be used repeatedly as "shortcuts," the functions can be executed easily and quickly. Such a shortcut is particularly useful when a routine task in which functions to be used are fixed is repeatedly executed.

There could be a routine task which includes multiple different processes. For example, one routine task may include scanning of multiple originals with appropriate parameters, respectively, or image data obtained by scanning is transmitted to different destinations individually.

In such a routine task, processes to be executed may be registered individually as respective shortcuts. Then, by execution g the shortcuts as registered sequentially to execute the functions (which will be referred to as shortcut functions) respectively represented by the shortcuts, the routine task may be efficiently executed.

SUMMARY

When multiple shortcut functions are sequentially executed within one routine task, the following operations are required. That is, when the currently executed shortcut function is finished and the next shortcut function is to be executed, the user is required to find the shortcut key corresponding to the next shortcut function and depress the same. Thus, it could not be said that the routine task, as a whole, can be executed relatively easily and quickly.

In consideration of the above, aspects of the present disclosures provide an improved function execution apparatus configured such that, when multiple shortcut functions as registered are sequentially executed, the multiple shortcut functions can be executed easily and quickly.

According to aspects of the disclosure, there is provided a function execution apparatus, which includes a display configured to display an image and a controller configured to execute multiple functions. The controller is configured to execute a shortcut registration process in which the controller registers a shortcut function which executes a particular function using a preliminarily set setting value necessary for executing the particular function, a first selection process in which the controller encourages a user to select multiple shortcut functions to be executed subsequently from among a plurality of shortcut functions registered with the function execution apparatus, a continuous execution registration process in which the controller registers a continuous execution function configured to execute the multiple shortcut functions selected in the first selection process such that the multiple functions are executed in accordance with a particular order, a first displaying process in which the controller displays a continuous execution key corresponding to the continuous execution functions registered in the continuous execution registration process, and a continuous execution process in which, when the continuous execution key displayed by the first displaying process is selected, the controller executes the multiple shortcut functions constituting the continuous execution function in accordance with the execution order.

According to aspects of the disclosures, there is provided a function execution method which includes a selection step in which the a user is encouraged to select multiple shortcut functions to be executed subsequently from among a registered plurality shortcut functions each of which is configured to be executed with user of a preliminarily setting value necessary for executing the particular function, a continuous execution registration step in which a continuous execution function configured to execute the multiple shortcut functions selected in the selection step such that the multiple functions are executed in accordance with a particular order, a displaying step in which a continuous execution key corresponding to the continuous execution functions registered in the continuous execution registration step, and a continuous execution step in which, when the continuous execution key displayed by the displaying step is selected, the controller executes the multiple shortcut functions constituting the continuous execution function in accordance with the execution order.

According to further aspects of the disclosures, there is provided a function execution apparatus, which has a display, and a controller. The controller is configured to execute registering a first shortcut function for executing a first particular function using a first preliminarily set of setting values, registering a second shortcut function for executing a second particular function using a second preliminarily set of setting values, displaying a first shortcut key corresponding to the first shortcut function on the display, displaying a second shortcut key corresponding to the second shortcut function on the display, receiving a designation of the first shortcut function and the second shortcut function, in response to the designation of the first shortcut function and the second shortcut function, registering a third shortcut function for executing the first particular function and the second particular function, displaying a third shortcut key corresponding to the third shortcut function on the display, and, in response to a designation of the third shortcut key, executing the first particular function using the first preliminary set of setting values and then executing the second particular function using the second preliminary set of setting values.

BRIEF DESCRIPTION OF THE ACCOMPANYING DRAWINGS

FIGS. 2A-2C illustrate transition from a stand-by screen to a shortcut listing screen, and a configuration of the shortcut listing screen according to the illustrative embodiment.

FIGS. 3A-3I illustrate a normal execution process when multiple execution shortcuts are subsequently executed according to the illustrative embodiment.

FIGS. 4A-4H illustrate a registration process of a continuous execution shortcut according to the illustrative embodiment.

FIGS. 5A-5H illustrate a process of executing the continuous execution shortcut when a execution subject moving option is disabled.

FIGS. 6A-6H illustrate a process of executing the continuous execution shortcut when the execution subject moving option is enabled

DETAILED DESCRIPTION OF THE EMBODIMENT

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

(1) Configuration of Image Processing System

Figure 1:
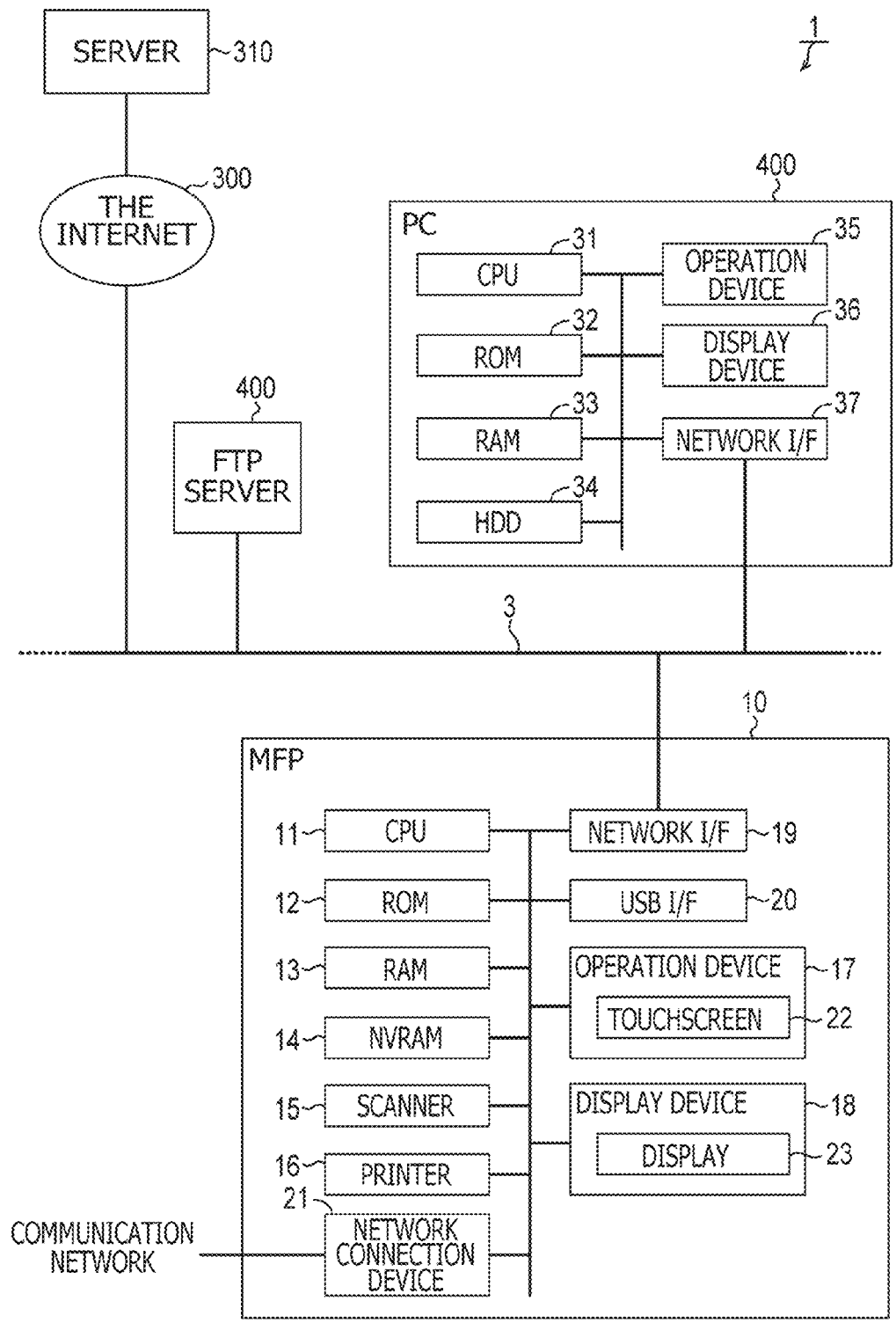
FIG. 1 is a block diagram showing a configuration of an image processing system according to an illustrative embodiment.
Figure 7:
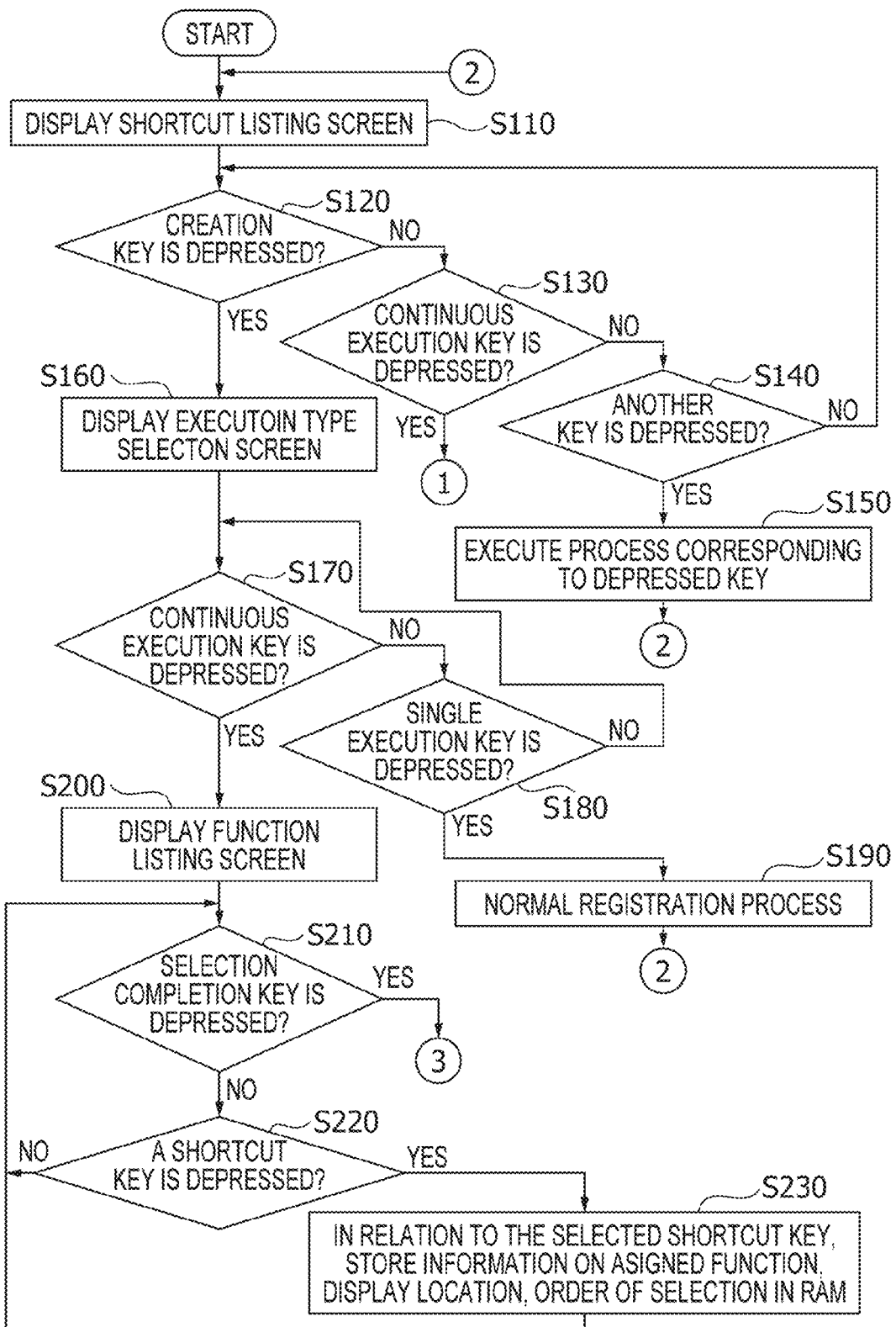
FIGS. 7-10 show a flowchart illustrating a shortcut control process according to the illustrative embodiment.
Figure 8:
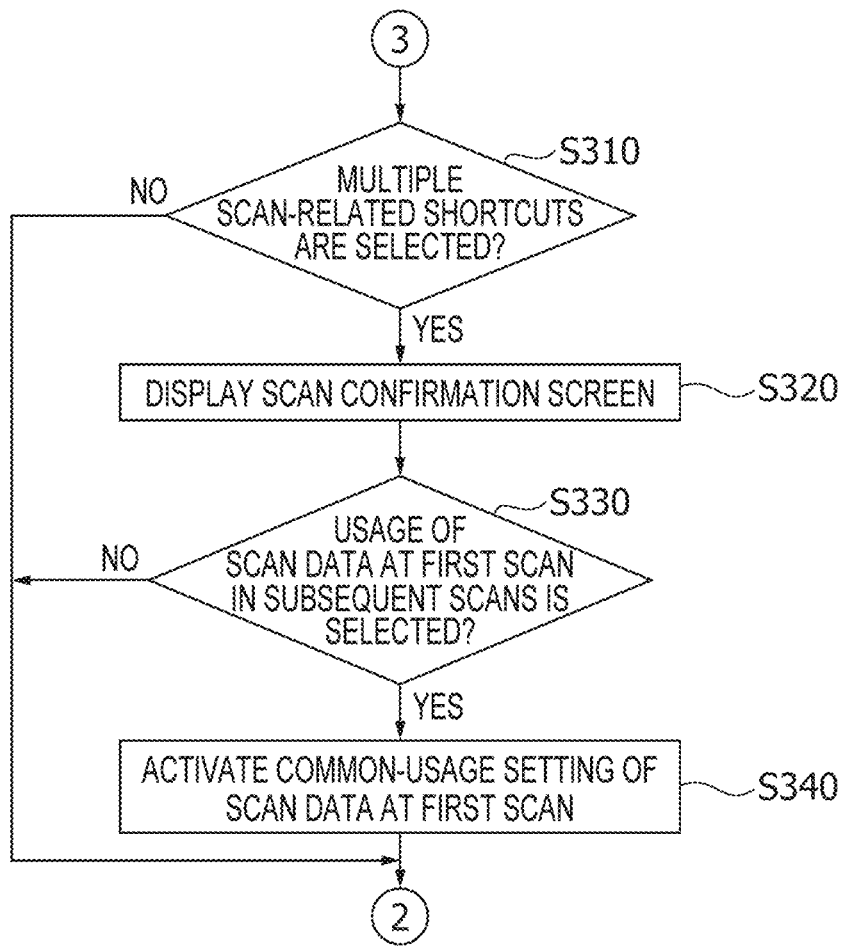

As shown in FIG. 1, an image processing system 1 according to an illustrative embodiment has an MFP (multi-function peripheral) 10 and a PC (personal computer) 30. A data communication is can be executed between the MFP 10 and PC 30 through a LAN (local area network) 3.

The MFP 10 has multiple functions such as a scanning function of scanning an image on an original, a printing function of printing out image scanned with the scanning function, and a facsimile function of transmitting/receiving facsimile data.

The MFP 10 has a CPU (central processing unit) 11, a ROM (read only memory) 12, a RAM (random access memory) 14, an NVRAM (non-volatile RAM) 14, a scanner 15, a printer 16, an operation device 17, a display device 18, a network interface 19, a USB (universal serial bus) interface 20 and a network connection device 21.

The CPU 11 executes programs stored in the ROM 12 or NVRAM 14 to control each component of the MFP 10 and to execute various calculations/operations. The RAM 13 is typically used as a main memory directly accessed by the CPU 11. The NVRAM 14 is an electrically rewritable non-volatile memory, and stores various pieces of setting information for the MFP 10. It is noted that setting and registration information of a shortcut function is also stored in the NVRAM 14. It is also noted that programs respectively corresponding to processes shown in FIGS. 7-10 are stored in the ROM 12 or the NVRAM 14.

The scanner 15 has an image sensor, and scan an image on the original and generates image data representing the scanned image. The printer 16 has a function of printing various pieces of image data including the image data scanned and generated by the scanner 15 on printing medium. The operation device 17 is an inputting device through which user's operations are input to the CPU 11. The displaying device 18 is provided with a touchscreen 22, has display (e.g., an liquid crystal display) 23 which is capable of displaying information. On a display area of the display 23, a touchscreen 22 is overlaid. The network interface 19 is an interface necessary to connect the MFP 10 to a LAN (local area network) 9. A USB (universal serial bus) network interface used to execute a data communication in accordance with a USB standard.

The network connection device 21 and interface for execution g a data communication with an external device via a communication network (in the illustrative element, a telephone network). According to the illustrative embodiment, RAM 33 and an HDD (hard disk drive) 34, the operation device 35, the displaying device 36 and the network interface 37.

The CPU 31 executes various programs stored in the ROM 32 and the HDD 34 to control respective components of the PC 30 and an external device (including the MFP 10). The ROM 32 stores programs and data executed/used by the CPU 31. The RAM 33 is typically used as a main memory when the CPU 31 executes various processes/operations. In the HDD 34, an OS (operation system), various device drivers, various pieces of application software are installed. The operation device 35 has a keyboard and various types of pointing devices. The displaying device 36 has a display such as a liquid crystal display or an OLED (organic light emitting display). The network interface 37 is a communication interface used to connect the PC 30 to the LAN 3.

An FTP (file transfer protocol) server 400 is connected to the LAN 3. The LAN 3 is connected to the Internet 300. To the internet 300, multiple information processing devices including a server 310 are connected. According to the illustrative embodiment, the MFP 10, the PC 30 and the FTP server 400 can execute the data communication with each other through the LAN 3. Further, the MFP 10, the PC 30 and the FTP server 400 can execute the data communication with various types of information processing devices connected to the Internet 300.

(2) Functions of MFP

The MFP 10 has, as already mentioned, multiple functions such as a scanning function, a copying function, a facsimile function. For at least the scanning function, it is further divided into multiple scan data processing functions based on handling of image data obtained by scanning (hereinafter, referred to as scan data). The scan data processing functions include, for example, a "Scan to PC" function, a "Scan to FTP" function, a "Scan to network" function, and a "Scan to USB" function.

The "Scan to PC" function is a function of transmitting scan data to a PC (e.g., the PC 30) connected to the MFP 10. The "Scan to FTP" is a function of transmitting the scan data to the FTP server. "Scan to Network" is a function of transmitting the scan data to any of various servers connected to the internet 300.

The "Scan to USB" function is a function of transmitting the scan data to a USB memory connected to the USB interface 20 and store therein.

(3) Shortcut Functions

When the above-described scan data processing functions the MFP 10 has are used, generally, the user executes multiple steps. For example, when the user wishes to use the Scan to PC function, it becomes necessary for the user to execute an input operation to designate a destination PC and setting/confirming operations to set/confirm various types of setting values when a scanning operation is executed. Examples of the various types of setting values include values representing whether both-side scanning is used or not, a color setting, a resolution for scanning, a size of the original, a file type of the scan data and the like. When, for example, the copying function is used, it becomes necessary to set/confirm the various setting values (e.g., copying image quality, a size of a printing sheet, a copying thickness, enlargement/reduction and the like. when the copying is executed. Thus, the user is required to execute a very troublesome operation if the scan data processing function is executed in accordance with a normal procedure.

According to the illustrative embodiment, the MFP 10 has a shortcut function with which the user can execute particular functions with less number of steps than usual by registering a shortcut thereof. According to the illustrative embodiment, the user can register a shortcut by preliminarily setting various setting values for the particular function subject to the shortcut registration. Once the shortcut registration is done, when the user depresses a shortcut key corresponding to the registered shortcut function the function is can be executed based on the preliminarily set setting values, without requiring further operation by the user, or with less operation by the user than usual. It is noted that, according to the illustrative embodiment, shortcut keys are displayed on the display 23, and the user may selectively tap portions of the touchscreen 22 corresponding to positions of the displayed shortcut keys, thereby the user's selection of the shortcut keys are inputted to the CPU 11. Throughout the description, such an operation of tapping the touchscreen 22 at a position corresponding to a shortcut key will be expressed by a term "depress" for simplifying the description.

According to the illustrative embodiment, the MFP 10 is configured that the total of 48 kinds of shortcuts can be registered. In order to register or executed each shortcut, a shortcut listing screen should be displayed on the display 23. According to the illustrative embodiment, when the MFP 10 is powered on, a stand-by screen is displayed on the display 23 after a particular initializing process is executed. There are multiple types of stand-by screens, and one stand-by screen 40 of the multiple stand-by screens is shown in FIG. 2.

Thee stand-by screen 40 shown in FIG. 2 enables the user to select one of the scanning functions the user wishes to executed from among the divided scan data processing functions. In the screen, multiple selection keys 41, 42 and 43 are displayed. When the user select one of the function selection keys as displayed, the corresponding scan data processing function is executed. Further, on the stand-by screen 40, a shortcut listing screen calling key 44 (hereinafter, referred to as an SC calling key 44) and a menu key 45 are included. When the menu key 45 is depressed, a menu screen enabling the user to sets various settings for the MFP 10 is displayed. When the SC calling key 45 is depressed, the shortcut listing screen 50-1, as shown on a right-hand side of FIG. 2, is displayed.

In FIG. 2, two types of screens are shown as examples of the shortcut listing screen 50-1. Hereinafter, based on the shortcut listing screen 50-1 shown in upper right of FIG. 2, the shortcut listing screen 50-1 will be described. As shown in FIG. 2, on the shortcut listing screen 50-1, a tab display area 57 and multiple (six, in the embodiment) key display areas 51-56 are assigned. In the tab display area 57, eight tabs (first to eighths tabs) are displayed, one of which selected by the user is displayed differently from the others to indicate its selected status. In an example of FIG. 2, the leftmost tab (i.e., first tab) is in the selected status.

It is noted that an affix "1" of the reference numeral "50-1" of the shortcut listing screen 50-1 indicates that the screen is the shortcut listing screen when the first tub is selected. According to the illustrative embodiment, the reference numeral of the shortcut screen when an n-th tub is selected is "50-n" by adding an affix "n." Further, in the following description, when all of or anyone of the first tub to the eight tub 50-1-50-8 are referred to, the reference number is indicated as "50."

In the key display areas 51-56, keys corresponding to the selected tab are displayed. That is, six keys are assigned for each tab. When the selected tab is switched to another, six keys corresponding to the newly selected tab are displayed in the key display areas 51-56.

There are multiple types of keys which can be displayed in the key display areas 51-56. For example, there are shortcut keys 61 and 62, shortcut creation keys 63-66 and a continuous execution key 71. To the shortcut execution keys 61 and 62, particular shortcuts having been registered are assigned, respectively. Thus, by operating one of the shortcut execution keys 61 and 62, a shortcut process corresponding to the operated one of the shortcut execution keys 61 and 62 is executed. When one of the shortcut creation keys 63-66 is operated, the control proceeds to a process of newly registering a shortcut, in which a new shortcut is registered. In that case, the newly registered shortcut is displayed in the selected display area in which the shortcut creation key was displayed. As the user executes an input operation to select a shortcut key, the shortcut process is executed based on the shortcut assigned to the selected shortcut key and registered.

It is noted that there are various types of operations which can be employed as an input operation of the user. In the following description, thus, in the illustrative embodiment, depression of the key (i.e., user's touch with a finger or the like on an area where the key the user intends to select is displayed) is used as an example of the user input (selection) operation. As shown in FIG. 2, on the shortcut listing screen 50, a menu key 67 is displayed at an upper right area. When the user depresses the menu key 67, the user is allowed to edit the registered shortcuts.

To the shortcut keys 61 and 62, profiles of the corresponding shortcuts are associated, respectively. The profile is information which is necessary to execute the function of the registered shortcut. Specifically, the profile includes information related to setting values of respective setting items which are necessary to execute the function.

When the function registered as the shortcut is the "Scan to USB," the profile includes a setting of execution/inexecution of the both-side scanning, a color setting, a scanning resolution, a file type and a USB port of a destination where the scan data is to be stored.

The profile is generated for individual shortcut when the shortcut is registered, and stored, for example in NVRAM 14. When one of the shortcut keys is depressed, a shortcut process based on the shortcut assigned to the shortcut key and registered with the MFP 10 is executed. Specifically, when the shortcut process is executed, the profile which is associated with the shortcut key and necessary for executing the shortcut is retrieved from the NVRAM 14. Then, in accordance with the thus retrieved profile, the shortcut process is executed.

(4) Successive Execution of Shortcuts

When the user wishes to execute the multiple shortcuts registered with the MFP 10, they can be executed in accordance with the following sequence. For example, it is assumed that Task 1 which is one of the shortcuts registered with the first tab, Task 1 which is one of the shortcuts registered with the fifth tab, and Task 3 is one of the multiple shortcuts registered with the sixth tab are to be executed sequentially.

In such a case, as shown in FIG. 3, the user firstly depressed an SC calling key 44 included in the stand-by screen 40 to cause the MFP 10 to display the shortcut listing screen 50. According to the illustrative embodiment, when the stand-by screen 40 is switched to the shortcut listing screen 50, the shortcut listing screen 50-1 (i.e., each key in the first tab), which corresponds to the first tab, is displayed as a default screen.

To the shortcut listing screen 50-1 corresponding to the first tab, Task 1 is assigned as a shortcut. The user is capable of causing the MFP 10 to execute the function registered as a shortcut of Task 1 by depressing the shortcut key 61 to which Task 1 is assigned. When Task 1 is being executed, an under-execution screen 801, which indicates that Task 1 is being executed, is displayed.

When Task 1 is completed, the display 23 displays the stand-by screen 40. Next, when the user depressed the SC calling key 44 again to executed Task 2, then the shortcut listing screen 50-1 which corresponds to the first tab. At this stage, if the user selects the fifth tab from the tab display area 57, the displayed screen is switched to another shortcut listing screen 50-5 which corresponds to the fifth tab. In the shortcut listing screen 50-5, a shortcut key 72 to which Task 2 is assigned is displayed. The user can make the function registered as a shortcut for Task 2 executed by depressing the shortcut key 72. When Task 2 is being executed, an under-execution screen 802 indicating that Task 2 is being executed is displayed.

When Task 2 is completed, the screen on the display 23 is switched to the stand-by screen 40. Next, when the user depressed the SC calling key 44 again to executed Task 3, then the shortcut listing screen 50-1 which corresponds to the first tab. At this stage, if the user selects the eighth tab from the tab display area 57, the displayed screen is switched to another shortcut listing screen 50-8 which corresponds to the eighth tab. In the shortcut listing screen 50-8, a shortcut key 73 to which Task 3 is assigned is displayed. The user can make the function registered as a shortcut for Task 3 executed by depressing the shortcut key 73. When Task 3 is being executed, an under-execution screen 803 indicating that Task 3 is being executed is displayed.

As described above, in order to execute multiple shortcuts subsequently, every time when one shortcut is finished, the stand-by screen 40 should be switched to the shortcut listing screen 50-1, and thereafter, the tab should be switched to one including a shortcut the user intends to execute, and the shortcut subject to execute should be depressed. Therefore, the more the number of shortcuts subject to execute and the more the degree of distribution of shortcuts to different tabs is, the more troublesome to execute the multiple shortcuts.

The MFP 10 according to the illustrative embodiment has a continuous execution function of shortcuts. When multiple shortcuts are registered, the user can register desired ones of the multiple shortcuts as the shortcuts subject to a continuous execution. Then, the user can executes the desired ones of the multiple shortcuts with a less number of operations, efficiently.

For example, the user can select desired ones of the multiple shortcuts, which are registered as continuously executed shortcuts subject to the continuous execution function. Specifically, continuous execution shortcut information, which is information regarding the selected ones of the multiple shortcuts, is registered. The registered continuously executed shortcuts are assigned to a single continuous execution key.

In the shortcuts listing screen 50-1 shown in FIG. 2C, a continuous execution key 71 is displayed in the fifth key display area 55. To the continuous execution key 71, the above-described three tasks, that is, Task 1, Task 2 and Task 3 (i.e., three shortcuts) are assigned. That is, to the continuous execution key 71, the continuous execution shortcut information regarding Tasks 1-3 is assigned. Examples of the continuous execution shortcut information are information on multiple registered shortcuts, display locations (e.g., tabs) of the respective shortcut keys, execution order of the respective shortcuts, and the like. when the user depressed the continuous execution key 71, the registered three shortcuts (i.e., Tasks 1-3) are subsequently executed based on the continuous execution shortcut information assigned to the continuous execution key 71.

A process of registering the continuous execution shortcut will be described with referring to FIGS. 4A-4H. When the user select a creation key with which the continuous execution shortcut is registered (e.g., a creation key 65 in the fifth key display area 55 in the first tab) from among creation keys in the shortcut listing screen 65 (see FIG. 4A), and depresses the same, an execution type selection screen 80 (FIG. 4B) is displayed. The execution type selection screen 80 is for encouraging the user to select whether the shortcut the user intends to newly register is a single execution type shortcut for execution g a single function or a continuous execution type shortcut for execution g multiple functions subsequently. For this purpose, on the execution type selection screen 80, a single execution type key 81 and a continuous execution type key 82 are displayed as shown in FIG. 4B.

When the single execution type key 81 is depressed, a registration process to register a shortcut for executing a single function is executed, and the shortcut can be registered. In such a case, a shortcut key to which the registered shortcut is assigned is displayed in the fifth key display area of the first tab.

When the continuous execution type key 82 is depressed, as shown in FIG. 4C, a function listing screen 90-1 is displayed. The function listing screen 90 is for encouraging the user to select shortcuts subject to the continuous execution (i.e., to be registered with a continuous execution shortcut). According to the illustrative embodiment, the function listing screen 90-1 corresponding to the first tab is displayed as a default screen. It is noted that the function listing screen 90-1 appears that a selection completion key 91 is added to the shortcut listing screen 50-1 corresponding to the first tab. By switching the tabs, keys corresponding to a switched tab can be displayed.

When the use wishes to register the continuous execution shortcut in which Task 1, Task 2 and Task 3 are executed in this order, the user firstly depresses a shortcut key 61 for Task 1 in the function listing screen 90-1 corresponding to the first tab. With this operation, Task 1 is tentatively registered as a subject to the continuous execution. At this stage, continuous execution shortcut information regarding Task 1 is stored in the RAM 13.

Next, the user switches the tab to the fifth tab in order to select Task 2 which the user intends to be executed. When the tabs are switched, a function listing screen 90-5 corresponding to the fifth tab is displayed. In the function listing screen 90-5, when the user depressed a shortcut key 72 of Task 2 in the function listing screen 90-5, Task 2 is tentatively registered subject to the continuous execution (i.e., as a task to be executed after Task 1).

Next, the user switches the tabs to eighth tab so as to select Task 3, which the user intends to be executed after Task 2. When the tabs are switched to the eighth tab, a function listing screen 90-8 corresponding to the eighth tab is displayed. If it is sufficient that the tasks subject to the continuous execution are Task 1 and Task 2, the user may depress selection completion key 91 after Task 2 is selected, the selection process is terminated, and the continuous execution shortcut can be registered.

When the user depresses the shortcut key 73 for Task 3 in the function listing screen 90-8 corresponding to the eighth tag, Task 3 is tentatively registered subject to the continuous execution (i.e., a task to be executed after Task 2 is completed). In the process described above, Tasks 1-3 have been tentatively registered. Thereafter, when the user depresses the selection completion key 91, a continuous execution shortcut in which Tasks 1-3 are subsequently executed is duly registered, and the shortcut listing screen 50-1, which was displayed when registration of the continuous execution shortcut was started, is executed. At this stage, however, in the fifth key display area 55, the continuous execution key 71 to which the registered continuous shortcut has been assigned is displayed instead of the creation key 65 which was depressed when registration was started.

When more than one shortcuts among the selected multiple shortcuts are scan-related function (i.e., a function related to the scan function) (e.g., Task 1 is the "Scan to FTP" function, and Task 2 is the "Scan to PC" function), a scan confirmation screen 110 (FIG. 4G) is displayed in response to depression of the selection completion key 91.

The scan confirmation screen 110 is a screen allowing the user to set enabling/disabling of common usage of image data which was scanned when the firstly executed scan-related shortcut, among the multiple scan-related shortcuts subject to the continuous execution, was executed. By enabling the common usage of the image data, the image data obtained by executing the first scan-related shortcut is used when a second and/or later scan-related shortcuts are executed. That is, even though multiple scan-related shortcuts are subject to the continuous execution, the scanning operation needs to be executed only once.

In the scan confirmation screen 110, a common use enabling key ("YES") 111, and a common use disabling key ("NO") 112 are displayed. When the common use enabling key 111 is depressed, the common use of the image data is enabled. That is, only one scanning operation is executed during execution of the continuous execution shortcut (i.e., when the first scan-related shortcut is executed), and in the subsequent scan-related shortcuts are executed, the image data firstly scanned is commonly used.

When the common use disabling key 112 is depressed, the common use of the image data is disabled. That is, a scanning operation is executed every time when a scan-related shortcut is executed during execution of the continuous execution shortcut.

When the common use enabling key 111 or the common use disabling key 112 is depressed, enabling/disabling of the common use of the image data is set depending on the depressed key, and the screen is switched to the shortcut listing screen 50-1 (FIG. 4H).

It is noted that, according to the illustrative embodiment, an execution subject moving option can be enabled/disabled. The execution subject moving option is an optional function to enable the user to move a subject (i.e., shortcut) to be executed when the multiple shortcuts subject to the continuous execution are executed in order (e.g., in the registered order). For example, when one of the multiple shortcuts (i.e., a subjective shortcut) is to be executed, the user may skip the one of the multiple shortcuts and make the next shortcut as a subjective shortcut to be executed (that is, the subjective shortcut is moved from the one of the multiple shortcuts to the next one of the multiple shortcuts). For another example, the user may move the subjective shortcut from the one of the multiple shortcuts to a previous one of the multiple shortcuts. Thus, the user can arbitrarily change the order of the multiple shortcuts to be executed and/or skip one or more of the same. When the execution subject moving option is disabled, the user cannot move the subjective shortcuts, and the multiple shortcuts as registered are executed in the registered order.

(5) Execution Example of Continuous Execution Shortcut

Next, a continuous execution shortcut process, which is executed when the continuous execution key to which the continuous execution shortcut is assigned, will be described referring to FIGS. 5A-5H and 6A-6H.

(5-1) When Execution Subject Moving Option is Disabled

An example when the execution subject moving option is disabled will be described with reference to FIGS. 5A-5H. When the SC calling key 44 in the stand-by screen 40 (FIG. 5A) is depressed, the shortcut listing screen 50-1 (FIG. 5B) is displayed. Then, by depressing the continuous execution key 71 displayed in the shortcut listing screen 50-1, an execution command receiving screen 100-1 (FIG. 5C) is displayed. It is noted that, to the continuous execution key 71, as described above, the continuous execution shortcut causing the shortcuts for Task 1, Task 2 and Task 3 to be executed in this order is assigned. In the following description, it is assumed that each of Task 1-Task 3 is scan-related shortcut.

The execution command receiving screen 100-1, which is firstly displayed on the continuous execution key 71 is depressed, is a screen displaying a shortcut key corresponding to the first-order shortcut, which is one of the multiple shortcuts assigned to the continuous execution key 71 and to be executed firstly among the multiple shortcuts, and encouraging the user to select the displayed shortcut key.

The execution command receiving screen 100-1 appears similar to the shortcut listing screen 50-1 corresponding to the first tab (FIG. 3B) but five shortcut keys other than the shortcut key 61 for Task 1 are grayed out. That is, in the execution command receiving screen 100-1, only the shortcut key 61 in the first key display area 51, which is the shortcut key for Task 1 about to be executed, is explicitly displayed, while the other five shortcut keys are hidden by a gray solid image 101. With this configuration, it becomes possible to make the user recognize that the shortcut about to be executed is Task 1.

When the user place the original to be scanned on the MFP 10 and depresses the shortcut key 61 for Task 1 displayed in the execution command receiving screen 100-1, Task 1 is executed. When Task 1 is being executed, an under-execution screen 801 indicating the Task 1 is being executed (FIG. 5D) is displayed. When Task 1 is completed, an execution command receiving screen 100-5 (FIG. 5E) is displayed.

The execution command receiving screen 100-5, which is displayed after Task 1 is completed, is a screen displaying a shortcut key corresponding to the second-order shortcut, which is one of the multiple shortcuts assigned to the continuous execution key 71 and to be executed secondly among the multiple shortcuts, and encouraging the user to select the displayed shortcut key. That is, the execution command receiving screen 100-5 corresponds to fifth tab including Task 2 which is the second-order shortcut.

The execution command receiving screen 100-5 appears similar to the shortcut listing screen 50-5 corresponding to the fifth tab (FIG. 3E) but five shortcut keys other than the shortcut key 72 for Task 2 are grayed out. That is, in the execution command receiving screen 100-5, only the shortcut key 72 in the second key display area 52, which is the shortcut key for Task 2 about to be executed, is explicitly displayed, while the other five shortcut keys are hidden by a gray solid image 102. With this configuration, it becomes possible to make the user recognize that the shortcut about to be executed is Task 2.

When the user place the original to be scanned on the MFP 10 and depresses the shortcut key 72 for Task 2 displayed in the execution command receiving screen 100-5, Task 2 is executed. When Task 2 is being executed, an under-execution screen 802 indicating the Task 2 is being executed (FIG. 5F) is displayed. When Task 2 is completed, an execution command receiving screen 100-8 (FIG. 5G) is displayed.

The execution command receiving screen 100-8, which is displayed after Task 2 is completed, is a screen displaying a shortcut key corresponding to the third-order shortcut, which is one of the multiple shortcuts assigned to the continuous execution key 71 and to be executed thirdly among the multiple shortcuts, and encouraging the user to select the displayed shortcut key. That is, the execution command receiving screen 100-8 corresponds to eighth tab including Task 3 which is the third-order shortcut.

The execution command receiving screen 100-8 appears similar to the shortcut listing screen 50-8 corresponding to the eighth tab (FIG. 3H) but five shortcut keys other than the shortcut key 73 for Task 3 are grayed out. That is, in the execution command receiving screen 100-8, only the shortcut key 73 in the fifth key display area 55, which is the shortcut key for Task 3 about to be executed, is explicitly displayed, while the other five shortcut keys are hidden by a gray solid image 105. With this configuration, it becomes possible to make the user recognize that the shortcut about to be executed is Task 3.

When the user place the original to be scanned on the MFP 10 and depresses the shortcut key 73 for Task 3 displayed in the execution command receiving screen 100-8, Task 3 is executed. When Task 3 is being executed, an under-execution screen 803 indicating the Task 3 is being executed (FIG. 5H) is displayed. When Task 2 is completed, as all the shortcuts subject to the continuous execution have been completed, the screen returns to the stand-by screen 40.

(5-2) When Execution Subject Moving Option is Enabled

An example when the execution subject moving option is enabled will be described with reference to FIGS. 6A-6H. When the SC calling key 44 in the stand-by screen 40 (FIG. 6A) is depressed, the shortcut listing screen 50-1 (FIG. 6B) is displayed. Then, by depressing the continuous execution key 71 displayed in the shortcut listing screen 50-1, an execution command receiving screen 120-1 (FIG. 6C) is displayed.

The execution command receiving screen 120-1 firstly displayed when the continuous execution key 71 is depressed appears similar to the execution command receiving screen 100-1 (FIG. 5C) which is displayed when the execution subject moving option is disabled, but the execution command receiving screen 120-1 includes an execution subject notifying image 131 and a forward key 141.

The execution subject notifying image 131 is an image showing what number is the shortcut which is about to be executed among the multiple shortcuts executed as the continuous execution shortcut. For example, the execution subject notifying image 131 shown in the first execution command receiving image 120-1 indicates that the first shortcut (i.e., Task 1) among the three shortcuts (i.e., Tasks 1-3) subject to the continuous execution is going to be executed.

The forward key 141 is a key for changing the screen to the next execution command receiving screen 120-5 without executing Task 1 which is about to be executed. When the user depresses the forward key 141, Task 1 which should have been executed is not executed, and the screen is switched to the execution command receiving screen 120-5 for Task 2, and the MFP 10 waits for an execution command for Task 2.

In the execution command receiving screen 120-1 for Task 1, when the user depresses the shortcut key 61 of the Task 1 with setting the original the user to be scanned, Task 1 is executed. When Task 1 is being executed, an under-execution screen 151 indicating Task 1 is being executed is displayed. Further, in the under-execution screen 151, an execution subject notification screen 151a indicating that a first-order task in the execution order is being executed is displayed. The execution subject notification screen 151a is identical to the execution subject notification screen 131 displayed in the previous execution command receiving screen 120-1. When Task 1 is completed, the execution command receiving screen 120-5 is displayed (FIG. 6E).

The execution command receiving screen 120-5 (FIG. 6E) displayed after completion of Task 1 appears similar to the execution command receiving screen 100-5 (FIG. 5E) displayed after completion of Task 1 when the execution subject moving option is disabled except that the execution subject notifying screen 132, the forward key 141 and the return key 142 are displayed in the execution command receiving screen 120-5.

The execution subject notifying screen 132 indicates that the shortcut about to be executed is the second number shortcut among the multiple shortcuts to be executed as the continuous execution shortcut. The forward key 141 is a key for change the screen to an execution command receiving screen 120-8 (FIG. 6G) for the next shortcut (i.e., Task 3 in this example). That is, in the execution command receiving screen 120-5 for Task 2, when the user depresses the forward key 141, Task 2 which is about to be executed is skipped, and the screen is switched to the execution command receiving screen 120-8 for the next task (i.e., Task 3), and the MFP 10 waits for an execution command of Task 3.

The return key 142 is a key for change the screen to the execution command receiving screen for the shortcut one number before the task (i.e., Task 2) about to be executed without executing task about to be executed. Thus, in this example, when the return key 142 is depressed, Task 2 is not executed and the execution command receiving screen 120-1, and the MFP 10 waits for the next execution command.

In the execution command receiving screen 120-5 for Task 2, when the user depresses the shortcut key for Task 2 with setting the original the user wishes to be scanned, Task 2 is executed. During execution of Task 2, an under-execution screen 152 indicating that Task 2 is being executed is displayed.

The execution command receiving screen 120-8 (FIG. 6G) displayed after completion of Task 2 appears similar to the execution command receiving screen 100-8 (FIG. 5G) displayed after completion of Task 2 when the execution subject moving option is disabled except that the execution subject notifying screen 133 and the return key 142 are displayed in the execution command receiving screen 120-8.

The execution subject notifying screen 133 indicates that the shortcut about to be executed is the third number shortcut among the multiple shortcuts to be executed as the continuous execution shortcut. The return key 142 is, as aforementioned, a key for changing the screen to a the execution command receiving screen 120-5 for the preceding task (Task 2, in this example). In the execution command receiving screen 120-8 for Task 3, when the user depresses the return key 142, Task 3 which is about to be executed is not executed, and the screen is switched the execution command receiving screen 120-5 (FIG. 6E) for Task 2, which is one Task before, and the MFP 10 waits for the execution command for Task 2.

In the execution command receiving screen 120-8 (FIG. 6G) for Task 3, when the user depresses the shortcut key 73 for Task 3 with setting the original the user wishes to be scanned, Task 3 is executed. During execution of Task 3, an under-execution screen 153 indicating that Task 3 is being executed is displayed. In the under-execution screen 153, an execution subject notifying image 153a indicating that the third number task in the execution order is being executed is displayed. When Task 3 is completed, all the shortcuts subject to the continuous execution have been completed, and the screen changes to the stand-by screen 40.

(6) Shortcut Controlling Process

Referring to FIGS. 7-10, a shortcut controlling process, which is executed when a condition for displaying the shortcut listing screen 50 is satisfied, will be described. The functions related to the shortcuts with reference to FIGS. 2A-2C, 3A-3H, 4A-4H, 5A-5H and 6A-6H are realized as the shortcut controlling process shown in FIGS. 7-10 is executed.

When a particular condition (e.g. depression of the SC calling key 44 in the stand-by screen 40) for displaying the shortcut listing screen 50 is satisfied, the CPU 11 of the MFP 10 retrieves a program of the shortcut controlling process from NVRAM 14.

When the shortcut controlling process is started, the CPU 11 displays the shortcut listing screen 50 in S110. According to the illustrative embodiment, the shortcut listing screen firstly displayed is the shortcut listing screen 50-1 (FIG. 3B) which corresponds to the first tab.

In S120, the CPU 11 determines whether the creation key, among various keys displayed in the shortcut listing screen 50-1, is depressed. When it is determined that the creation key has not be depressed (S120: NO), the CPU 11 determines whether the continuous execution key is depressed (S130). When it is determined that the continuous execution key has not be depressed (S130: NO), the CPU 11 determines whether another key is depressed (S140). When it is determined that no key has been depressed (S140: NO), the CPU 11 returns to S120. When it is determined that another key (e.g., the shortcut key, the menu key or the like) has been depressed (S140: YES), the CPU 11 executes a process corresponding to the depressed key in S150, and returns to S110. For example, when it is determined that the shortcut key has been depressed, the CPU 11 executes the shortcut process based on the shortcut assigned to the depressed shortcut key, and returns to S110.

In the shortcut listing screen 50-1, when it is determined that the creation key is depressed (S120: YES), the CPU 11 displays the execution type selection screen 80 (FIG. 4B) in S160. In S170, the CPU 11 determines whether the continuous execution type key 82 displayed in the execution type selection screen 80 is depressed. When it is determined that the continuous execution type key 82 is not depressed (S170: NO), the CPU 11 determines whether a single execution type key 81 is depressed in S180. When it is determined that the single execution type key 81 is not depressed (S180: NO), the CPU 11 returns to S170. When it is determined that the single execution key 81 is depressed (S180: YES), the CPU 11 executes a normal registration process in S190, and returns to S110. The normal registration process is a process of registering one shortcut for one function.

When it is determined that the continuous execution type key 82 is depressed (S170: YES), the CPU 11 displays a function listing screen 90 (FIG. 4C) in S200. According to the illustrative embodiment, a function listing screen 90-1, which corresponds to the first tab, is displayed firstly. It is noted that the tab subject to display can be switched to any desired one of the displayed tabs.

In S210, the CPU 11 determines whether a selection completion key 91 is depressed. When it is determined that the selection completion key is not depressed (S210: NO), the CPU 11 determines whether a shortcut key is depressed in S220. When it is determined that no shortcut key is not depressed (S220: NO), the CPU 11 returns to S210. When it is determined that a shortcut key is depressed (S220: YES), the CPU proceeds to S230.

In S230, continuous execution shortcut information regarding the shortcut assigned to the selected (i.e., depressed) shortcut key is stored in the RAM 13. The continuous execution shortcut includes, as aforementioned, information on the functions (including profile) registered as the shortcut, a display position of the shortcut (e.g., the tab corresponding to the shortcut), the order of execution of the shortcuts and the like. After the continuous execution shortcut information is stored, the CPU 11 returns to S210.

When it is determined that the selection completion key 91 is depressed (S210: YES), the CPU 11 proceeds to S310 of FIG. 8. In S310, the CPU 11 determines whether more than one scan-related shortcuts are selected. When the number of selected scan-related shortcuts is one or zero (S310: NO), the CPU 11 returns to S110. When more than one scan-related shortcuts are selected (S310: YES), the CPU 11 displays the scan confirmation screen 110 (FIG. 4G) in S320.

In S330, the CPU 11 determines whether usage of the scan data which is scanned at first time is used in subsequent scan-related shortcuts is determined in the scan confirmation screen 110. That is, it is determined whether the common setting enabling key 111 is depressed. When it is determined that the common setting enabling key 111 is not depressed and the common setting disabling key 112 is depressed (S330: NO), the CPU 11 returns to S110. When it is determined that the common setting enabling key 111 is depressed (S330: YES), the CPU 11 enables the common usage of the scan data obtained in the first scan, and returns to S110.

Figure 9:
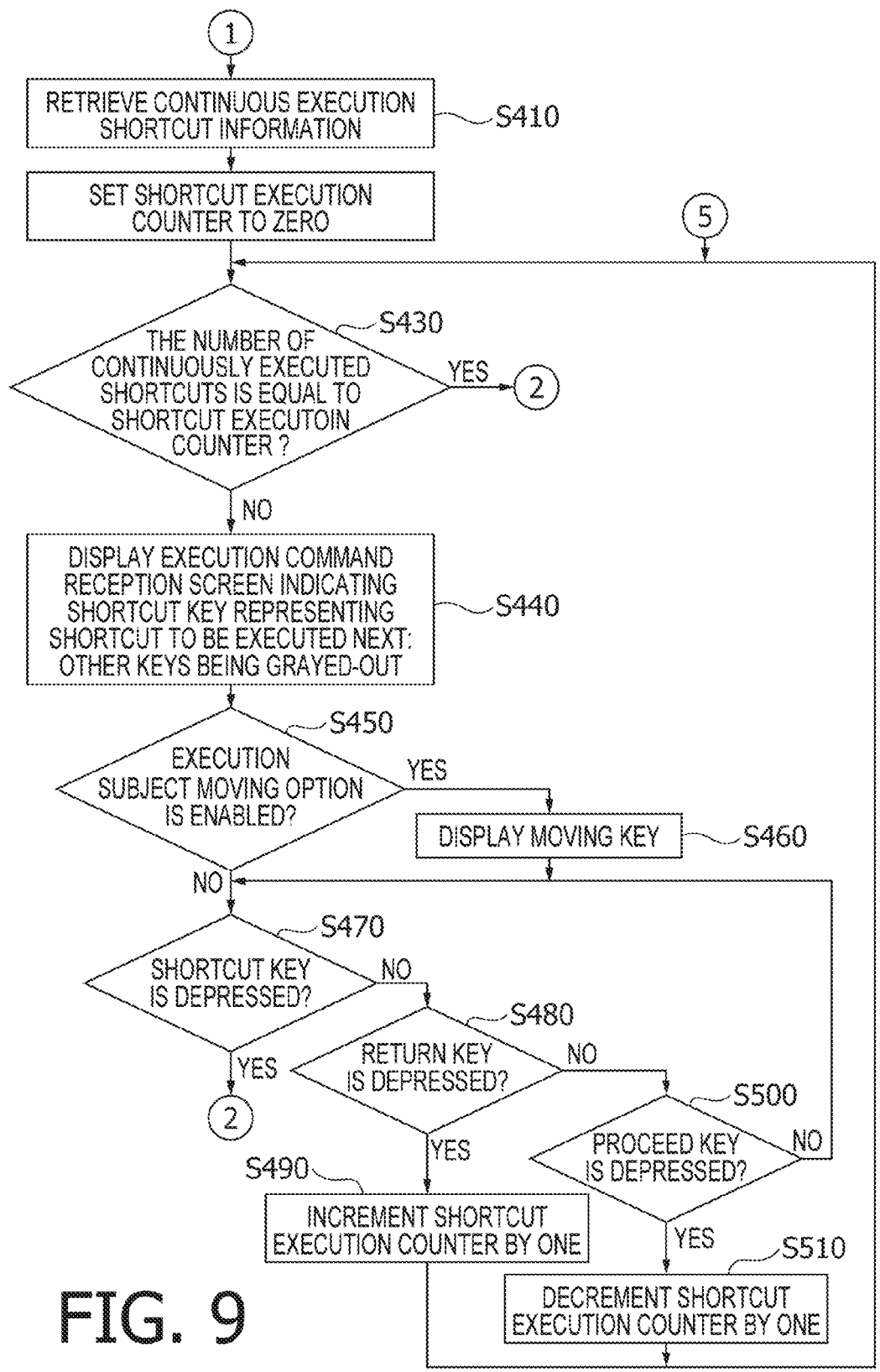

When it is determined that the continuous execution key is depressed in the shortcut listing screen 50-1 (S130: YES), the CPU 11 proceeds to S410 (FIG. 9). In S410, the CPU 11 retrieves the continuous execution shortcut indicating the continuous execution shortcut assigned to the depressed continuous execution key. Then, in S420, the CPU 11 clears (i.e., sets to zero) the shortcut execution counter.

In S430, the CPU 11 determines whether the number of shortcuts subject to the continuous execution and the value of the shortcut execution counter are equal to each other. When it is determined that the number of shortcuts subject to the continuous execution and the value of the shortcut execution counter are equal to each other (S430: YES), all the shortcut processes of the multiple shortcuts subject to the continuous execution have been executed, and the CPU 11 returns to S110. When it is determined that the number of shortcuts subject to the continuous execution and the value of the shortcut execution counter are not equal to each other (S430: NO), the CPU 11 proceeds to S440.

In S440, the CPU 11 displays the execution command receiving screen (e.g., FIGS. 5C, 5E, 5G, 6C, 6E and 6G) in which the shortcut key of the shortcut about to be executed is displayed, while the other shortcut keys are grayed-out.

In S450, the CPU 11 determines whether the execution subject moving option is set to be enabled. When it is determined that the execution subject moving option is enabled (S450: YES), the CPU 11 displays a moving keys in S460, and proceeds to S470. The moving key is at least one of the forward key 141 shown in FIGS. 6C and 6E and the reverse key 142 shown in FIGS. 6E and 6G.

According to the illustrative embodiment, in the execution command receiving screen corresponding to the shortcut to be executed firstly, only the forward key 141 is displayed. Further, in the execution command receiving screen corresponding to the shortcut to be executed lastly, only the reverse key 142 is displayed. In the other execution command receiving screens, both the forward key 141 and the reverse key 142 are displayed. When it is determined that the execution subject moving option is not enabled (S450: NO), the CPU 11 proceeds to S470.

In S470, the CPU 11 determines whether a shortcut key is depressed in the currently displayed execution command receiving screen. In the execution command receiving screen, only the shortcut key for the shortcut about to be executed is displayed among the multiple shortcuts subject to the continuous execution. Accordingly, in S470, the CPU 11 determines whether the shortcut key of the shortcut which is about to be executed is depressed or not.

When it is determined that the shortcut key is not depressed in the execution command receiving screen (S470: NO), the CPU 11 proceeds to S480. In S480, the CPU 11 determines whether the reverse key 142 is depressed in the execution command receiving screen. When it is determined that the reverse key 142 is depressed (S480: YES), the CPU 11 increments the shortcut execution counter by one in S490, and returns to S430.

When the reverse key 142 is not displayed in the execution command receiving screen or the revere key 142 is not depressed although it is displayed in the execution command receiving screen (S480: NO), the CPU 11 proceeds to S500. In S500, the CPU 11 determines whether the forward key 141 is depressed in the execution command receiving screen. When it is determined that the forward key 141 is not depressed (S500: NO), the CPU 11 returns to S470. When it is determined that the forward key 141 is depressed (S500: YES), the CPU 11 decrements the shortcut execution counter by one and returns to S430.

When the CPU 11 executes S440 again, as it is determined in S480 that the reverse key 142 is depressed and CPU 11 returns S430 via S490, the execution command receiving screen in which the shortcut key of the previous shortcut in the execution order is displayed while the other shortcut keys are grayed out is displayed. Further, when the CPU 11 executes S440 again, as it is determined in S500 that the forward key 141 is depressed and the CPU 11 returns to S430 via S510, the execution command receiving screen in which the shortcut key of the next shortcut in the execution order is displayed while the other shortcut keys are grayed out is displayed.

Figure 10:
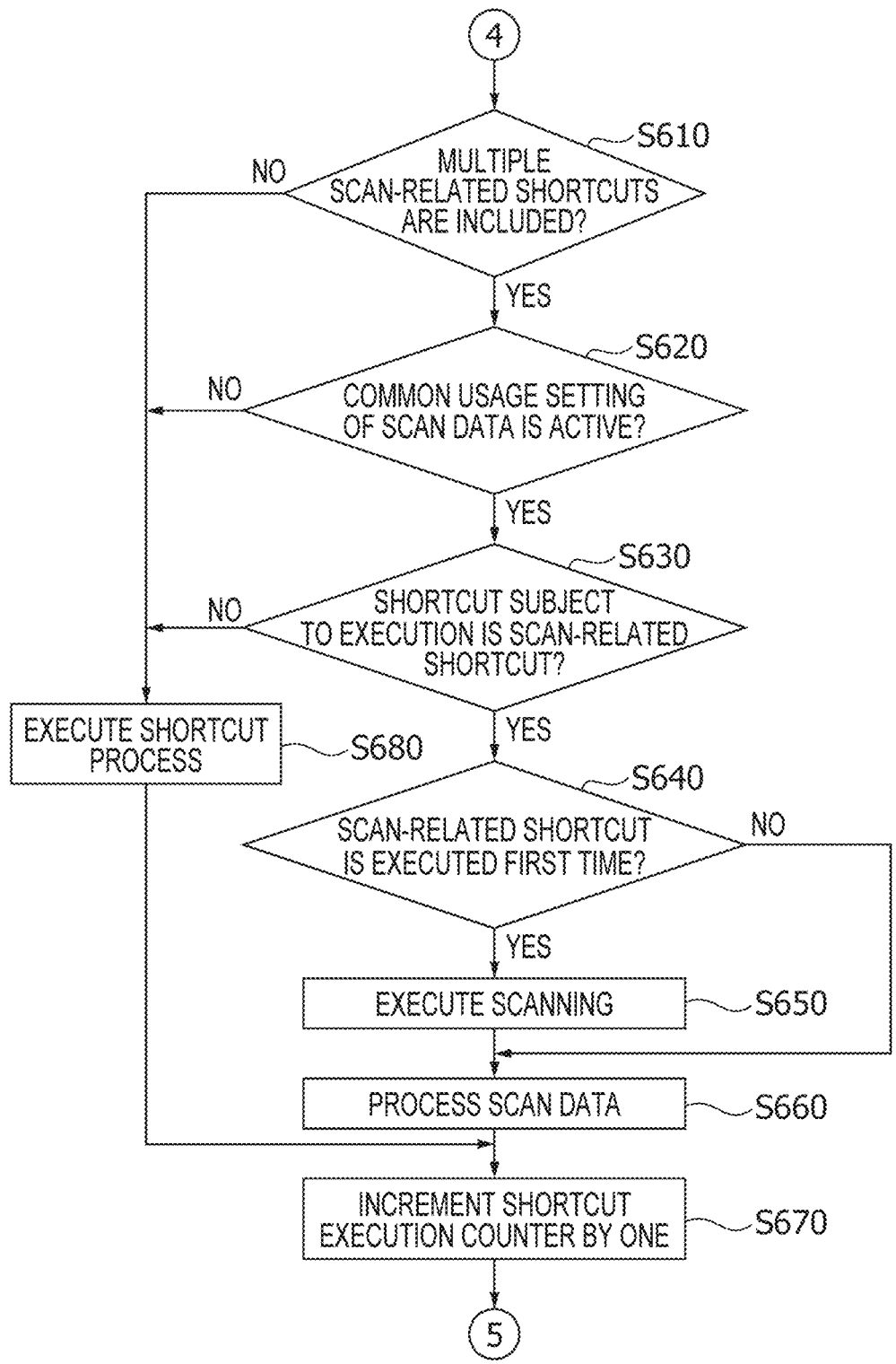

When it is determined that a shortcut key is depressed in the execution command receiving screen (S470: YES), the CPU 11 proceeds to S670 (FIG. 10). In S610, the CPU 11 determines whether the continuous execution shortcut currently executed include multiple scan-related shortcuts. When it is determined that the currently executed continuous shortcuts does not include the multiple scan-related shortcuts (S610: NO), the CPU 11 executes a shortcut process of the shortcut corresponding to the depressed shortcut key in S680, and proceeds to S670.

When it is determined that the currently executed continuous execution shortcut includes multiple scan-related shortcuts (S610: YES), the CPU 11 determines whether the common usage setting of the scan data is enabled in S620. When it is determined that the common usage setting is disabled (S620: NO), the CPU 11 proceeds to S680. When it is determined that the common usage setting of the scan data is enabled (S620: YES), the CPU 11 proceeds to S630.

In S630, the CPU 11 determines whether the execution subject shortcut is the scan-related shortcut. When it is determined that the execution subject shortcut is not the scan-related shortcut (S630: NO), the CPU 11 proceeds to S680. When it is determined that the execution subject shortcut is the scan-related shortcut (S630: YES), the CPU 11 proceeds to S640.

In S640, the CPU 11 determines whether execution of the scan-related shortcut is executed first time in the currently executed continuous execution shortcut. When it is determined that execution of the scan-related shortcut is first time (S640: YES), the CPU 11 executes scanning of the original in S650. Then, in S660, the CPU 11 executes the scan data process using the scan data obtained by scanning the original, that is, the scanning function registered as the scan-related shortcut.

When it is determined that the execution of the scan-related shortcut is not the first time, that is the shortcut process of the scan-related shortcut has been executed at least once (S640: NO), the CPU 11 proceeds to S660. In this case, in S660, the CPU 11 executes the scan data processing using the scan data which has already been obtained in the previous scan-related shortcut process or in the scan-related shortcut process before the previous scan-related shortcut process. After execution of S660, the CPU 11 increments one to the shortcut execution counter by one, and returns to S430 (FIG. 9).

(7) Effects of the Illustrative Embodiment

According to the MFP 10, when the multiple shortcuts are registered, desired ones of the multiple shortcuts are collected and registered as the continuous execution shortcut. Then, simply by depressing the continuous execution key corresponding to the continuous execution shortcut as registered, the shortcut processes of the corresponding shortcuts can be executed subsequently in accordance with a particular order.

Therefore, when shortcut processes of a plurality of shortcuts are to be executed subsequently, the shortcut processes can be executed easily and quickly by registering the same as the continuous execution shortcut.

Further, among the multiple shortcuts subject to the continuous execution in the continuous execution shortcut, before at least the second and later shortcuts are executed, the execution command receiving screen corresponding to a tab including the shortcut key of the shortcut is displayed. In the execution command receiving screen, among the six shortcut keys displayable for each tab, the shortcut key of the execution subject shortcut is displayed, while the other five shortcut keys are grayed out. That is, the shortcut key of the shortcut about to be executed is highlighted in the execution command receiving screen. When the displayed shortcut key corresponding to the shortcut about to be executed is depressed, the corresponding function is executed.

Accordingly, the user can recognize the shortcut about to be executed easily and quickly, which improves the operability of the MFP 10. Further, inadvertent execution of the shortcuts which need not be executed can be prevented or suppressed.

According to the illustrative embodiment, the execution subject moving option can be enabled/disabled. When the execution subject moving option is enabled, as described with reference to FIGS. 6A-6H, the shortcut about to be executed is skipped and the next shortcut can be executed, or the previous shortcut may be executed. With this configuration, the user can skip unnecessary shortcuts and/or re-execute the shortcut having been executed.

It is noted that the CPU 11 of the MFP 10 is an example of a controller set forth in claims. The execution command receiving screen 100 shown in FIGS. 5C, 5E and 5G and the execution command receiving screen shown in FIGS. 6C, 6E and 6G are examples of execution subject information set forth in the claims. Further, depression of one shortcut key (i.e., the shortcut key of the execution subject) shown in the execution command receiving screens 100 and 120 is an example of an execution command operation set forth in the claims.

Further, a displaying method of the shortcut keys shown in the execution command receiving screens 100 and 120, that is, the display method of displaying only the shortcut key of a shortcut subject to execution and graying out of the other shortcut keys is an example of a highlighted display method set forth in the claims.

In a case where the execution subject moving option is enabled, the forward key 141 in the execution command receiving screen 120 is an example of a first transition image, and the reverse key 142 is an example of a second transition image in the claims. Further, depression of the forward key 141 is an example of a first transition operation, and depression of the reverse key 142 is an example of a second transition operation set forth in the claims. The scanner 15 is an example of a scanner set forth in the claims. The scan-related shortcut is an example of an image-related function set forth in the claims.

Other Embodiments

It is noted that the above-described embodiment is only a one illustrative embodiment, and the disclosures are not intended to limit the configuration to the above-described illustrative embodiment. The disclosure can be embodied in various ways.

(1) In the above-described illustrative embodiment, when the continuous execution shortcut is executed, the execution command receiving screen is displayed for each of the multiple shortcut registered as the continuous execution shortcut, before the shortcut is executed, and an execution command by the user (i.e., depression of the shortcut key) is waited. Such a configuration may be modified in various ways, and for example, reception of the execution command by the user may be omitted. That is, when the continuous execution key is depressed, the registered multiple shortcuts may be automatically executed subsequently without requiring the user operation.

In such a case, when the continuous execution shortcut is being executed, the under-execution screen indicating the currently executed shortcut among the shortcuts subject to the continuous execution may be displayed on the display 23. For example, when the continuous execution shortcut is for subsequently executing Task 1, Task 2 and Task 3, once the continuous execution shortcut key is depressed and the shortcuts are started to be executed, the display 23 may subsequently show the under-execution screen 801 showing Task 1, the under-execution screen 802 shoring Task 2, and the under-execution screen 803 showing Task 3 (see FIGS. 3C, 3F and 3I), and then display the stand-by screen 40 when all the shortcuts processes of the continuous execution shortcut have been completed.

(2) It is noted that the method of highlighting the shortcut key subject to execution in the execution command receiving screen shown in FIGS. 5C, 5E, 5G, 6C, 6E and 6G is merely an example, and any other methods of highlighting may be employed. For example, the shortcut key subject to execution may be blinked, while the other five shortcut keys may be displayed in a dimmed manner so as not to be conspicuous.

(3) Regarding the execution command receiving screen when the execution subject moving option is enabled, the reverse key 142 may be displayed in the execution command receiving screen 120-1 displaying the shortcut key for the first shortcut in the execution order. In such a case, when the reverse key 142 is depressed, the execution command receiving screen 120-8 showing the shortcut key for the last shortcut in the execution order may be displayed. The forward key 141 may be displayed in the execution command receiving screen 120-8 displaying the shortcut key for the last shortcut in the execution order. In such a case, when the forward key 141 is depressed, the execution command receiving screen 120-1 showing the shortcut key for the first shortcut in the execution order may be displayed.

What is claimed is:

1. A function execution apparatus, comprising:
a display configured to display an image from a first memory storing image data; and
a controller configured to execute multiple functions,
wherein the controller is configured to execute:
registering multiple shortcut functions in a second memory which execute particular functions using preliminarily set setting values necessary for executing the particular functions, respectively;
receiving a user selection of at least a first shortcut function and a second shortcut function to be executed subsequently from among the multiple shortcut functions;

registering the first shortcut function and the second shortcut function in the second memory as a continuous execution function;

displaying a continuous execution key corresponding to the registered continuous execution function; and wherein, when the displayed continuous execution key is selected, the controller:

executes the first shortcut function;

automatically displays, following completion of the first shortcut function, execution subject information indicating the second shortcut function to be executed subsequently; and executes the second shortcut function in response to a user selection of the execution subject information.

2. The function execution apparatus according to claim 1, wherein the controller is configured to execute:

displaying execution subject information indicating a shortcut function of an execution subject in the continuous execution function before the shortcut function is executed regarding a second or later shortcut functions in the execution order;

receiving a particular execution command for the displayed execution subject information; and executing the shortcut function of the execution subject for the received execution command operation.

3. The function execution apparatus according to claim 2, wherein the controller is further configured to execute:

displaying to display a shortcut screen showing shortcut keys for respective the registered shortcut functions; and when a selection operation of one of the shortcut keys is performed for the displayed shortcut screen, executing the shortcut function corresponding to the shortcut key, wherein the controller is further configured to execute:

displaying the shortcut screen including the shortcut key corresponding to the shortcut function subject to execution as the execution subject information in continuous execution function, and in the shortcut screen, displaying a subject key which is the shortcut key corresponding to the shortcut function subject to execution in a particular highlighting manner different from the other shortcut keys, and wherein the execution command operation is a particular operation of selecting the subject key in the shortcut screen displayed in the continuous execution function.

4. The function execution apparatus according to claim 1, wherein the controller is further configured to execute:

inputting at least one of a first transition operation and a second transition operation before execution of a subject function in the continuous execution function, the subject function being at least one of the multiple shortcut functions subject to execution, the first transition operation being a user operation to move to a next shortcut function in an execution order of the shortcut functions, the second transition operation being a user operation to move to a previous shortcut function in an execution order of the shortcut functions, and wherein, when one of the first transition operation and second transition operation is inputted, the shortcut function before execution is switched to a shortcut function corresponding to the inputted one of the first transition operation and the second transition operation.

5. The function execution apparatus according to claim 4, wherein the controller is configured to execute:

displaying at least one of a first transition image to proceed to the shortcut which is a next execution subject, and a second transition image to proceed to the shortcut which is a previous execution subject, wherein the first transition operation being an operation to select the first transition image, and wherein the second transition operation is an operation to select the second transition image.

6. The function execution apparatus according to claim 1, wherein the controller is configured to execute the multiple shortcut functions constituting the continuous execution function corresponding to the selected continuous execution key.

7. The function execution apparatus according to claim 1, wherein the controller is configured to execute displaying information indicating that the shortcut function being executed on the display during which the shortcut function subject to execution is executed.

8. The function execution apparatus according to claim 1, further comprising a scanner configured to scan an image on an original, wherein the controller is configured to execute selecting whether scanning of image is executed once and a result of scanning is used in multiple image-related functions when there is a plurality of image-related functions which are shortcut functions, among the received multiple shortcut functions, associated with image scanning operations with use of the scanner, and wherein the controller is configured to execute:

scanning of the image when the first image-related function in an execution order is executed and uses the result of scanning in all the image-related functions, when the selection is made to use the result of scanning.

9. A computer implemented function execution method, comprising:

a selection step in which the a user is encouraged to select multiple shortcut functions to be executed by a controller subsequently from among a registered plurality shortcut functions each of which is registered in a memory and configured to be executed using preliminarily setting values necessary for executing the particular functions, respectively;

a continuous execution registration step in which a first shortcut function and a second shortcut function are registered in the memory as a continuous execution function;

a displaying step in which a continuous execution key corresponding to the continuous execution function registered in the continuous execution registration step; and a continuous execution step in which, when the continuous execution key displayed by the displaying step is selected, the controller executes the first shortcut function, automatically displays, following completion of the first shortcut function, execution subject information indicating the second shortcut function to be executed subsequently; and executes the second shortcut function in response to a user selection of the execution subject information.

10. A function execution apparatus, comprising:

a display; and a controller configured to execute:

registering a first shortcut function for executing a first particular function using a first preliminarily set of setting values;

registering a second shortcut function for executing a second particular function using a second preliminarily set of setting values;

displaying a first shortcut key corresponding to the first shortcut function on the display;
displaying a second shortcut key corresponding to the second shortcut function on the display;
receiving a designation of the first shortcut key and the second shortcut key;
in response to the designation of the first shortcut function and the second shortcut function, registering a third shortcut function for continuously executing the first particular function and the second particular function;
displaying a third shortcut key corresponding to the third shortcut function on the display; and
in response to a designation of the third shortcut key:
  executing the first particular function using the first preliminary set of setting values;
  automatically displaying, following completion of the first particular function, execution subject information indicating the second particular function to be executed subsequently; and
  executing the second particular function using the second preliminary set of setting values in response to a designation of the execution of the subject information.

11. The function execution apparatus according to claim 10,
wherein the controller is configured to further execute:
in response to a designation of the third shortcut key, displaying subject information indicating the second shortcut function on the display after executing the first shortcut function and before executing the second shortcut function; and
receiving a particular execution command for executing the second shortcut function after displaying the subject information; and
in response to receiving the particular execution command, executing the second shortcut function.

12. The function execution apparatus according to claim 11,
wherein
the first shortcut key is displayed in a first manner on the display,
the subject information is the second shortcut key, and
the second shortcut key is displayed in a second manner on the display, the second manner being different from the first manner.

13. The function execution apparatus according to claim 10,
wherein the controller is configured to further execute:
displaying a forward key and a back key on the display;
in response to a designation of the forward key, executing the second shortcut function before executing the first shortcut function when the third shortcut key is designated; and
in response to a designation of the back key, executing the first shortcut function before executing the second shortcut function when the third shortcut key is designated and the first shortcut function is executed.

14. The function execution apparatus according to claim 10, wherein, in response to the designation of the third shortcut key, the second shortcut function is automatically executed after the first shortcut function is executed.

15. The function execution apparatus according to claim 10,
wherein the controller is configured to further execute:
displaying information indicating that the first shortcut function is executed on the display while the first shortcut function is executed.

16. The function execution apparatus according to claim 10,
further comprising an image scanner,
wherein
the first shortcut function includes a scanning function using the image scanner and the second shortcut function includes the scanning function using the image scanner, and
in response to the designation of the third shortcut key, the scanning function is executed while the first shortcut function is executed and the scanning function is not executed while the second shortcut function is executed.

* * * * *

UNITED STATES PATENT AND TRADEMARK OFFICE
CERTIFICATE OF CORRECTION

PATENT NO. : 9,609,156 B2
APPLICATION NO. : 14/868847
DATED : March 28, 2017
INVENTOR(S) : Takatoshi Ono Page 1 of 1

It is certified that error appears in the above-identified patent and that said Letters Patent is hereby corrected as shown below:

On the Title Page

(57) Abstract should read:
A function execution method includes a selection step in which a user is encouraged to select multiple shortcut...

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*